(12) United States Patent
Ota et al.

(10) Patent No.: US 11,764,353 B2
(45) Date of Patent: Sep. 19, 2023

(54) HIGH ENERGY-DENSITY COMPOSITION-GRADIENT ELECTRODES AND METHODS OF MAKING THE SAME

(71) Applicant: 24M Technologies, Inc., Cambridge, MA (US)

(72) Inventors: Naoki Ota, Lexington, MA (US); Junzheng Chen, Concord, MA (US); Ricardo Bazzarella, Woburn, MA (US)

(73) Assignee: 24M Technologies, Inc., Cambridge, MA (US)

( * ) Notice: Subject to any disclaimer, the term of this patent is extended or adjusted under 35 U.S.C. 154(b) by 0 days.

(21) Appl. No.: 16/422,304

(22) Filed: May 24, 2019

(65) Prior Publication Data
US 2019/0363351 A1 Nov. 28, 2019

Related U.S. Application Data

(60) Provisional application No. 62/676,049, filed on May 24, 2018.

(51) Int. Cl.
*H01M 4/36* (2006.01)
*H01M 4/04* (2006.01)
(Continued)

(52) U.S. Cl.
CPC ......... *H01M 4/366* (2013.01); *H01M 4/0404* (2013.01); *H01M 4/0426* (2013.01);
(Continued)

(58) Field of Classification Search
CPC ............... H01M 4/366; H01M 4/0404; H01M 2004/021
See application file for complete search history.

(56) References Cited

U.S. PATENT DOCUMENTS 5,837,397 A * 11/1998 Xing ...................... H01M 4/13
429/162
8,722,226 B2 5/2014 Chiang et al.
(Continued)

FOREIGN PATENT DOCUMENTS

WO WO 2015/188113 12/2015

OTHER PUBLICATIONS

Duduta, et al., Advanced Energy Materials, 2011, vol. 1, pp. 511-516 (Year: 2011).*
(Continued)

*Primary Examiner* — Sadie White
(74) *Attorney, Agent, or Firm* — Cooley LLP

(57) ABSTRACT

Embodiments described herein relate generally to devices, systems and methods of producing high energy density electrodes including a first electrode material disposed on a current collector and having a first porosity, and a second electrode material disposed on the first electrode material and having a second porosity less than the first porosity. In some embodiments, the second electrode material includes a mixture of an active material and a conductive material in a liquid electrolyte. In some embodiments, the first electrode materials can have a different composition than the second electrode material. In some embodiments, the first electrode material can include a high-capacity material such as tin, silicon antimony, aluminum, or titanium oxide. In some embodiments, a lithium-containing material can be disposed between the first electrode material and the second electrode material.

21 Claims, 15 Drawing Sheets

(51) Int. Cl.
  *H01M 4/38*    (2006.01)
  *H01M 4/02*    (2006.01)
(52) U.S. Cl.
  CPC ........... *H01M 4/386* (2013.01); *H01M 4/387* (2013.01); *H01M 2004/021* (2013.01)

(56) References Cited

U.S. PATENT DOCUMENTS

| | | |
|---|---|---|
| 8,722,227 B2 | 5/2014 | Chiang et al. |
| 8,778,552 B2 | 7/2014 | Chiang et al. |
| 8,993,159 B2 | 3/2015 | Chiang et al. |
| 9,153,833 B2 | 10/2015 | Chiang et al. |
| 9,178,200 B2 | 11/2015 | Bazzarella et al. |
| 9,184,464 B2 | 11/2015 | Chiang et al. |
| 9,203,092 B2 | 12/2015 | Slocum et al. |
| 9,293,781 B2 | 3/2016 | Chiang et al. |
| 9,362,583 B2 | 6/2016 | Chiang et al. |
| 9,385,392 B2 | 7/2016 | Chiang et al. |
| 9,401,501 B2 | 7/2016 | Bazzarella et al. |
| 9,437,864 B2 | 9/2016 | Tan et al. |
| 9,484,569 B2 | 11/2016 | Doherty et al. |
| 9,564,630 B2 | 2/2017 | Wang et al. |
| 9,583,780 B2 | 2/2017 | Chiang et al. |
| 9,614,231 B2 | 4/2017 | Carter et al. |
| 9,786,944 B2 | 10/2017 | Chiang et al. |
| 9,812,674 B2 | 11/2017 | Bazzarella et al. |
| 9,825,280 B2 | 11/2017 | Chiang et al. |
| 9,831,518 B2 | 11/2017 | Chiang et al. |
| 9,831,519 B2 | 11/2017 | Chiang et al. |
| 9,831,522 B2 | 11/2017 | Tan et al. |
| 10,115,970 B2 | 10/2018 | Ota et al. |
| 10,122,044 B2 | 11/2018 | Tan et al. |
| 10,153,651 B2 | 12/2018 | Taylor et al. |
| 10,181,587 B2 | 1/2019 | Ota et al. |
| 10,230,128 B2 | 3/2019 | Chiang et al. |
| 10,236,518 B2 | 3/2019 | Chiang et al. |
| 10,411,310 B2 | 9/2019 | Chiang et al. |
| 10,483,582 B2 | 11/2019 | Chiang et al. |
| 10,497,935 B2 | 12/2019 | Ota et al. |
| 10,522,870 B2 | 12/2019 | Tan et al. |
| 10,566,581 B2 | 2/2020 | Bazzarella et al. |
| 10,566,603 B2 | 2/2020 | Slocum et al. |
| 10,593,952 B2 | 3/2020 | Ota et al. |
| 10,601,239 B2 | 3/2020 | Taylor et al. |
| 10,637,038 B2 | 4/2020 | Zagars et al. |
| 10,734,672 B2 | 8/2020 | Chen et al. |
| 10,777,852 B2 | 9/2020 | Woodford et al. |
| 10,854,869 B2 | 12/2020 | Bazzarella et al. |
| 11,309,531 B2 | 4/2022 | Slocum et al. |
| 11,342,567 B2 | 5/2022 | Chiang et al. |
| 11,462,722 B2 | 10/2022 | Aranami et al. |
| 11,469,065 B2 | 10/2022 | Lawrence et al. |
| 11,476,551 B2 | 10/2022 | Tyler et al. |
| 2003/0082446 A1* | 5/2003 | Chiang ............... H01M 4/0423 429/209 |
| 2003/0228249 A1* | 12/2003 | Fujimura ............... C25D 15/02 423/446 |
| 2006/0024579 A1* | 2/2006 | Kolosnitsyn ......... H01M 4/382 429/209 |
| 2006/0246354 A1* | 11/2006 | Lee ......................... H01M 4/62 429/246 |
| 2009/0297951 A1* | 12/2009 | Katsura ................ H01M 4/583 427/78 |
| 2010/0047671 A1 | 2/2010 | Chiang et al. |
| 2010/0323264 A1 | 12/2010 | Chiang et al. |
| 2011/0168550 A1* | 7/2011 | Wang ................... H01M 4/139 204/290.12 |
| 2011/0189520 A1 | 8/2011 | Carter et al. |
| 2011/0200848 A1 | 8/2011 | Chiang et al. |
| 2011/0274948 A1 | 11/2011 | Duduta et al. |
| 2012/0070741 A1 | 3/2012 | Liu et al. |
| 2012/0164499 A1 | 6/2012 | Chiang et al. |
| 2013/0055559 A1 | 3/2013 | Slocum et al. |
| 2013/0065122 A1 | 3/2013 | Chiang et al. |
| 2013/0309547 A1 | 11/2013 | Bazzarella et al. |
| 2013/0337319 A1 | 12/2013 | Doherty et al. |
| 2014/0004437 A1 | 1/2014 | Slocum et al. |
| 2014/0030623 A1 | 1/2014 | Chiang et al. |
| 2014/0038045 A1* | 2/2014 | Lee ....................... H01M 4/13 429/213 |
| 2014/0039710 A1 | 2/2014 | Carter et al. |
| 2014/0154546 A1 | 6/2014 | Carter et al. |
| 2014/0170524 A1* | 6/2014 | Chiang ................. H01M 8/225 429/482 |
| 2014/0248521 A1 | 9/2014 | Chiang et al. |
| 2014/0315097 A1 | 10/2014 | Tan et al. |
| 2015/0024279 A1 | 1/2015 | Tan et al. |
| 2015/0129081 A1 | 5/2015 | Chiang et al. |
| 2015/0140371 A1 | 5/2015 | Slocum et al. |
| 2015/0171406 A1 | 6/2015 | Bazzarella et al. |
| 2015/0280267 A1 | 10/2015 | Chiang et al. |
| 2015/0295272 A1 | 10/2015 | Chiang et al. |
| 2015/0357626 A1 | 12/2015 | Holman et al. |
| 2016/0013507 A1 | 1/2016 | Chiang et al. |
| 2016/0056490 A1 | 2/2016 | Chiang et al. |
| 2016/0056491 A1 | 2/2016 | Chiang et al. |
| 2016/0105042 A1 | 4/2016 | Taylor et al. |
| 2016/0126543 A1 | 5/2016 | Ota et al. |
| 2016/0133916 A1 | 5/2016 | Zagars et al. |
| 2016/0190544 A1 | 6/2016 | Slocum et al. |
| 2016/0218375 A1 | 7/2016 | Chiang et al. |
| 2016/0226065 A1* | 8/2016 | Karabacak .......... H01M 4/0421 |
| 2016/0268621 A1 | 9/2016 | Chiang et al. |
| 2016/0285085 A1* | 9/2016 | Madden ............... H01M 10/054 |
| 2016/0308218 A1 | 10/2016 | Ota et al. |
| 2016/0322632 A1* | 11/2016 | Strunk ................. H01M 4/0404 |
| 2016/0344006 A1 | 11/2016 | Ota et al. |
| 2016/0372802 A1 | 12/2016 | Chiang et al. |
| 2017/0018798 A1 | 1/2017 | Tan et al. |
| 2017/0025646 A1 | 1/2017 | Ota et al. |
| 2017/0025674 A1 | 1/2017 | Tan et al. |
| 2017/0033389 A1 | 2/2017 | Chiang et al. |
| 2017/0033390 A1 | 2/2017 | Chiang et al. |
| 2017/0077464 A1 | 3/2017 | Bazzarella et al. |
| 2017/0162863 A1 | 6/2017 | Doherty et al. |
| 2017/0214034 A1 | 7/2017 | Ota et al. |
| 2017/0237111 A1 | 8/2017 | Holman et al. |
| 2017/0237112 A1 | 8/2017 | Holman et al. |
| 2017/0288281 A1 | 10/2017 | Chiang et al. |
| 2018/0034090 A1 | 2/2018 | Chiang et al. |
| 2018/0048008 A1* | 2/2018 | Johnston ............... H01M 8/1004 |
| 2018/0175428 A1 | 6/2018 | Chiang et al. |
| 2018/0175445 A1 | 6/2018 | Tan et al. |
| 2018/0233708 A1 | 8/2018 | Bazzarella et al. |
| 2018/0233722 A1 | 8/2018 | Holman et al. |
| 2018/0287220 A1 | 10/2018 | Woodford et al. |
| 2019/0036101 A1 | 1/2019 | Tyler et al. |
| 2019/0058184 A1 | 2/2019 | Bazzarella et al. |
| 2019/0245242 A1 | 8/2019 | Tan et al. |
| 2019/0319460 A1 | 10/2019 | Taylor et al. |
| 2019/0326562 A1 | 10/2019 | Ota et al. |
| 2019/0348705 A1 | 11/2019 | Chen et al. |
| 2019/0355998 A1 | 11/2019 | Chiang et al. |
| 2019/0393477 A1 | 12/2019 | Lawrence et al. |
| 2020/0014025 A1 | 1/2020 | Zagars et al. |
| 2020/0044296 A1 | 2/2020 | Chiang et al. |
| 2020/0106094 A1 | 4/2020 | Ota et al. |
| 2020/0161688 A1 | 5/2020 | Chaing et al. |
| 2020/0220118 A1 | 7/2020 | Bazzarella et al. |
| 2020/0220204 A1 | 7/2020 | Tan et al. |
| 2020/0259338 A1 | 8/2020 | Taylor et al. |
| 2020/0321597 A1 | 10/2020 | Zagars et al. |
| 2020/0321601 A1 | 10/2020 | Slocum et al. |
| 2020/0358129 A1 | 11/2020 | Chen et al. |
| 2020/0411825 A1 | 12/2020 | Bazzarella et al. |
| 2021/0091366 A1 | 3/2021 | Bazzarella et al. |
| 2021/0249678 A1 | 8/2021 | Chiang et al. |
| 2022/0037749 A1 | 2/2022 | Bazzarella et al. |
| 2022/0052403 A1 | 2/2022 | Chen et al. |
| 2022/0077445 A1 | 3/2022 | Ota et al. |
| 2022/0085440 A1 | 3/2022 | Ota et al. |
| 2022/0093929 A1 | 3/2022 | Chen et al. |
| 2022/0115710 A1 | 4/2022 | Zagars et al. |

(56) References Cited

U.S. PATENT DOCUMENTS

| | | |
|---|---|---|
| 2022/0172916 A1 | 6/2022 | Lawrence et al. |
| 2022/0173446 A1 | 6/2022 | Chiang et al. |
| 2022/0200306 A1 | 6/2022 | Kusachi et al. |
| 2022/0231274 A1 | 7/2022 | Zagars et al. |
| 2022/0238923 A1 | 7/2022 | Chen et al. |
| 2022/0263104 A1 | 8/2022 | Chiang et al. |
| 2022/0263193 A1 | 8/2022 | Chen et al. |
| 2022/0278427 A1 | 9/2022 | Lawrence et al. |
| 2022/0285669 A1 | 9/2022 | Doherty et al. |
| 2022/0352597 A1 | 11/2022 | Chen et al. |

OTHER PUBLICATIONS

Eom, et al., Journal of the Electrochemical Society, 2006, vol. 153, A1678 (Year: 2006).*
Chen, et al., Nano Res., 2011, 4(3), pp. 290-296 (Year: 2011).*
International Search Report and Written Opinion for International Application No. PCT/US2019/033965, dated Oct. 8, 2019, 9 pages.
First Examination Report for Indian Application No. 202017053544, dated Sep. 7, 2022, 6 pages.

* cited by examiner

HIGH ENERGY-DENSITY COMPOSITION-GRADIENT ELECTRODES AND METHODS OF MAKING THE SAME

CROSS-REFERENCE TO RELATED APPLICATIONS

This application claims priority to and the benefit of U.S. Provisional Patent Application No. 62/676,049 entitled "High Energy-Density Composition-Gradient Electrodes and Methods of Making the Same," filed May 24, 2018, the disclosure of which is hereby incorporated by reference in its entirety.

BACKGROUND

Consumers want a battery that can charge quickly and that can store enough energy to carry out any intended application for as long as desired. In order to achieve the desired theoretical energy density, battery manufacturers have increased the thickness of the electrodes to increase the total ion/electron storage capacity of the electrodes. However, these thicker electrodes often result in a portion of the active material being largely unavailable for ion/electron storage because of the reduced conductivity across portions of these electrodes as a function of electrode thickness. Battery manufacturers have also used high-capacity materials in electrodes (e.g., anodes) to increase the theoretical energy density, however these materials often expand and contract volumetrically during use of the electrode, which can damage the battery. Thus, it is an enduring goal of energy storage systems development to reduce inactive components in the electrodes and finished batteries and to increase energy density and overall performance.

SUMMARY

Embodiments described herein relate generally to devices, systems and methods of producing high energy density electrodes including a first electrode material disposed on a current collector and having a first porosity, and a second electrode material disposed on the first electrode material and having a second porosity. In some embodiments, the second porosity is less than the first porosity. In some embodiments, the second porosity is substantially equal to the first priority. In some embodiments, the second porosity is greater than the first porosity.

In some embodiments, the second electrode material includes a mixture of an active material and a conductive material in a liquid electrolyte. In some embodiments, the first electrode materials can have a different composition than the second electrode material. In some embodiments, the first electrode material can include a high-capacity material such as tin, tin alloy such as Sn—Fe, tin mono oxide, silicon, silicon alloy such as Si—Co, silicon monoxide, aluminum, aluminum alloy, mono oxide metal (CoO, FeO, etc.) or titanium oxide. In some embodiments, silicon and/or silicon alloy and/or silicon mono-oxide have a higher concentration (e.g., by volume percentage) in the first layer than second layer. In some embodiments, a lithium-containing material can be disposed between the first electrode material and the second electrode material. In some embodiments, a portion of the first electrode material can be removed to expose a portion of the current collector such that, when the second electrode material is disposed onto the first electrode material, a portion of the second electrode material can be disposed directly onto the exposed portion of the current collector.

DETAILED DESCRIPTION

Figure 1:
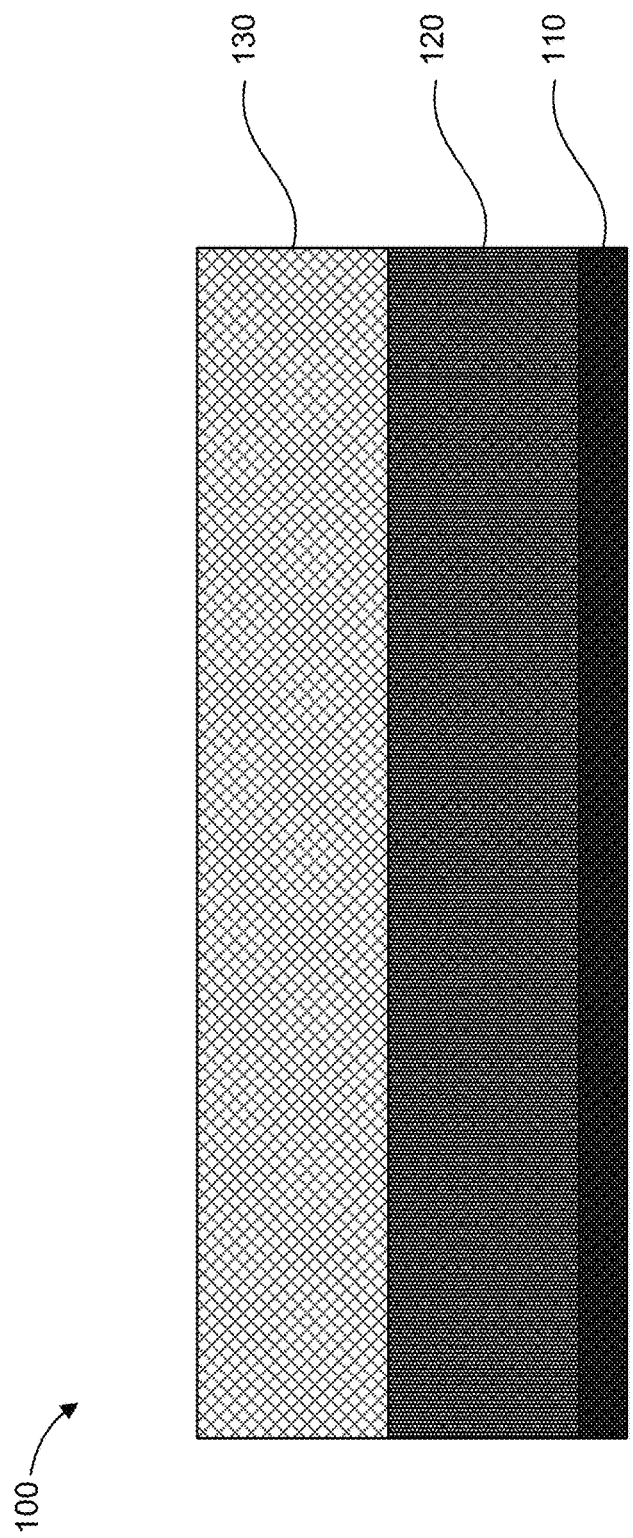
FIG. 1 is a schematic illustration of a multi-layered electrode, according to an embodiment.

Embodiments described herein relate generally to devices, systems, and methods of producing high energy density electrodes having a porosity that increases with distance from a current collector.

Conventional battery systems store electrochemical energy by separating an ion source and ion sink at differing ion electrochemical potential. A difference in electrochemical potential produces a voltage difference between the positive and negative electrodes, which produces an electric current if the electrodes are connected by a conductive element. Differences in electrochemical potential between the positive and negative electrodes may produce a higher voltage system, which contributes to higher energy density cells. In a conventional battery system, negative electrodes and positive electrodes are connected via a parallel configuration of two conductive elements. The external elements exclusively conduct electrons, however, the internal elements, being separated by a separator and electrolyte, exclusively conduct ions. The external and internal flow streams supply ions and electrons at the same rate, as a charge imbalance cannot sustain between the negative electrode and positive electrode. The produced electric current can drive an external device. A rechargeable battery can be recharged by application of an opposing voltage difference that drives electric and ionic current in an opposite direction as that of a discharging battery. Accordingly, active material of a rechargeable battery should have the ability to accept and provide ions. Increased electrochemical potentials produce larger voltage differences between the cathode and anode of a battery, which increases the electrochemically stored energy per unit mass of the battery.

Consumer electronic batteries have gradually increased in energy density with the progress of lithium-ion battery technology. The stored energy or charge capacity of a manufactured battery is a function of: (1) the inherent charge capacity of the active material (mAh/g), (2) the volume of the electrodes ($cm^3$) (i.e., the product of the electrode thickness, electrode area, and number of layers (stacks)), and (3) the loading of active material in the electrode media (e.g., grams of active material per $cm^3$ of electrode media). Therefore, to enhance commercial appeal (e.g., increased energy density and decreased cost), it is generally desirable to increase the areal charge capacity ($mAh/cm^2$). The areal charge capacity can be increased, for example, by utilizing active materials that have a higher inherent charge capacity, increasing relative percentage of active charge storing material (i.e., "loading") in the overall electrode formulation, and/or increasing the relative percentage of electrode material used in any given battery form factor. Said another way, increasing the ratio of active charge storing components (e.g., the electrodes) to inactive components (e.g., the separators and current collectors), increases the overall energy density of the battery by eliminating or reducing components that are not contributing to the overall performance of the battery. One way to accomplish increasing the areal charge capacity, and therefore reducing the relative percentage of inactive components, is by increasing the thickness of the electrodes.

Conventional electrode compositions generally cannot be made thicker than about 100 m because of certain performance and manufacturing limitations. For example, i) conventional electrodes having a thickness over 100 µm (single sided coated thickness) typically have significant reductions in their rate capability due to diffusion limitations through the thickness of the electrode (e.g. porosity, tortuosity, impedance, etc.) which grows rapidly with increasing thickness; ii) thick conventional electrodes are difficult to manufacture due to drying and post processing limitations, for example, solvent removal rate, capillary forces during drying that leads to cracking of the electrode, poor adhesion of the electrode to the current collector leading to delamination (e.g., during the high speed roll-to-roll calendering process used for manufacturing conventional electrodes), migration of binder during the solvent removal process and/or deformation during a subsequent compression process; iii) without being bound to any particular theory, the binders used in conventional electrodes may obstruct the pore structure of the electrodes and increase the resistance to diffusion of ions by reducing the available volume of pores and increasing tortuosity (i.e. effective path length) by occupying a significant fraction of the space between the functional components of the electrodes (i.e. active and conductive components). It is also known that binders used in conventional electrodes can at least partially coat the surface of the electrode active materials, which slows down or completely blocks the flow of ions to the active materials, thereby increasing tortuosity.

Furthermore, known conventional batteries either have high capacity or high rate capability, but not both. A battery having a first charge capacity at first C-rate, for example, 0.5 C generally has a second lower charge capacity when discharged at a second higher C-rate, for example, 2 C. This is due to the higher energy loss that occurs inside a conventional battery due to the high internal resistance of conventional electrodes (e.g. solid electrodes with binders), and a drop in voltage that causes the battery to reach the low-end voltage cut-off sooner. A thicker electrode generally has a higher internal resistance and therefore a lower rate capability. For example, a lead acid battery does not perform well at 1 C C-rate. They are often rated at a 0.2 C C-rate and even at this low C-rate, they cannot attain 100% capacity. In contrast, ultra-capacitors can be discharged at an extremely high C-rate and still maintain 100% capacity, however, they have a much lower charge capacity than conventional batteries. Accordingly, a need exists for electrodes that can be made thicker and yet have superior performance characteristics such as superior rate capability and charge capacity. Gradients in physical properties and composition can aid the diffusion of electroactive species. Gradients in composition can include active material composition.

Therefore, embodiments described herein relate generally to electrodes having a compositional gradient in a z direction (also called "the [001] directions"), i.e., in a direction perpendicular to the surface of the current collector (hereafter "electrode thickness"). In other words, the electrode can be engineered to be at least partially anisotropic and/or heterogeneous in order to tailor the electrode for mechanical, chemical, and/or electrochemical performance enhancements.

As used herein, "composition" can be anisotropic and can refer to physical, chemical, or electrochemical composition or combinations thereof. For example, in some embodiments, the electrode material directly adjacent to a surface of a current collector can be less porous than electrode material further from the surface of the current collector. Without wishing to be bound by any particular theory, the use of a porosity gradient, for example, may result in an electrode that can be made thicker without experiencing reduced ionic conductivity. In some embodiments, the composition of the electrode material adjacent to the surface of the current collector can be different chemically than the electrode material further from the surface of the current collector.

As used herein, the term "about" and "approximately" generally mean plus or minus 10% of the value stated, e.g., about 250 µm would include 225 µm to 275 µm, about 1,000 µm would include 900 µm to 1,100 µm.

As used herein, the term "semi-solid" refers to a material that is a mixture of liquid and solid phases, for example, such as particle suspension, colloidal suspension, emulsion, gel, or micelle.

As used herein, the terms "activated carbon network" and "networked carbon" relate to a general qualitative state of an electrode. For example, an electrode with an activated carbon network (or networked carbon) is such that the carbon particles within the electrode assume an individual particle morphology and arrangement with respect to each other that facilitates electrical contact and electrical conductivity between particles and through the thickness and length of the electrode. Conversely, the terms "unactivated carbon network" and "unnetworked carbon" relate to an electrode wherein the carbon particles either exist as individual particle islands or multi-particle agglomerate islands that may not be sufficiently connected to provide adequate electrical conduction through the electrode.

As used herein, the terms "energy density" and "volumetric energy density" refer to the amount of energy (e.g., MJ) stored in an electrochemical cell per unit volume (e.g., L) of the materials included for the electrochemical cell to operate such as, the electrodes, the separator, the electrolyte, and the current collectors. Specifically, the materials used for packaging the electrochemical cell are excluded from the calculation of volumetric energy density.

As used herein, the terms "high-capacity materials" or "high-capacity anode materials" refer to materials with irreversible capacities greater than 300 mAh/g that can be incorporated into an electrode in order to facilitate uptake of electroactive species. Examples include tin, tin alloy such as Sn—Fe, tin mono oxide, silicon, silicon alloy such as Si—Co, silicon monoxide, aluminum, aluminum alloy, mono oxide metal (CoO, FeO, etc.) or titanium oxide.

As used herein, the term "composite high-capacity electrode layer" refers to an electrode layer with both a high-capacity material and a traditional anode material, e.g., a silicon-graphite layer.

As used herein, the term "solid high-capacity electrode layer" refers to an electrode layer with a single solid phase high-capacity material, e.g., sputtered silicon, tin, tin alloy such as Sn—Fe, tin mono oxide, silicon, silicon alloy such as Si—Co, silicon monoxide, aluminum, aluminum alloy, mono oxide metal (CoO, FeO, etc.) or titanium oxide.

In some embodiments, the compositional gradient can include any physical, chemical, and/or electrochemical characteristic of the electrode material. In some embodiments, the compositional gradient can include a change in porosity of the electrode material across the electrode thickness. In some embodiments, the compositional gradient can include a change in an active material or an active material concentration across the electrode thickness. In some embodiments, the compositional gradient can include a change in a conductive material or a conductive material concentration across the electrode thickness. In some embodiments, the compositional gradient can include a change in an electrolyte or an electrolyte concentration across the electrode thickness. In some embodiments, the compositional gradient can include a change in an additive (e.g., an electrolyte additive) or an additive concentration across the electrode thickness. In some embodiments, the compositional gradient can include a change in density (unit mass per unit volume) across the electrode thickness. In some embodiments, the compositional gradient can include a change in a degree of crystallinity of a material across the electrode thickness. In some embodiments, the compositional gradient can include change between at least one of cubic, hexagonal, tetragonal, rhombohedral, orthorhombic, monoclinic, and triclinic crystal structures across the electrode thickness. In some embodiments, the compositional gradient can include a change in pH across the electrode thickness. In some embodiments, the compositional gradient can include a change in ionic conductivity across the electrode thickness. In some embodiments, the compositional gradient can include a change in electron conductivity across the electrode thickness. In some embodiments, the compositional gradient can include a change in energy density across the electrode thickness. In some embodiments, the compositional gradient can include a change in theoretical energy density across the electrode thickness. In some embodiments, the compositional gradient can include a change in Young's modulus across the electrode thickness. In some embodiments, the compositional gradient can include a change in yield strength across the electrode thickness. In some embodiments, the compositional gradient can include a change in tensile strength across the electrode thickness. In some embodiments, the compositional gradient can include a change in volumetric expansion/contraction potential across the electrode thickness during operation of the electrochemical cell. In some embodiments, the compositional gradient can include a change in plastic deformability of the electrode material across the electrode gradient. In some embodiments, the compositional gradient can include a change in solubility of at least one of the active material, the conductive material, and the additive in the electrolyte across the electrode thickness. In some embodiments, the compositional gradient can include a change in binder percentage across the electrode thickness. In some embodiments, the compositional gradient can include a change in workability of the electrode material across the electrode thickness. In some embodiments, the compositional gradient can include a change in the flowability of the electrode material across the electrode thickness. In some embodiments, the compositional gradient can include a change in ion storage potential across the electrode thickness. In some embodiments, the compositional gradient can include a change in a capacity fade experienced after initial charge/discharge cycling across the electrode thickness. In some embodiments, the compositional gradient can include a change in viscosity across the electrode thickness. In some embodiments, the compositional gradient can include a change in density across the electrode thickness. In some embodiments, the compositional gradient can include a change in surface area across the electrode thickness. In some embodiments, the change in surface area across the electrode thickness can be due to a change in active material concentration (i.e., higher concentration of active material closer to the current collector than further away or vice versa). In some embodiments, the change in surface area across the electrode thickness can be due to a change in active material composition (i.e., different active material composition close to the current collector from the active material composition further from the current collector).

In some embodiments, in order to accomplish a compositional gradient through the electrode thickness, a number of compositionally distinct electrode materials can be disposed on the current collector (e.g., as a laminate structure). In some embodiments, the number of compositionally distinct electrode materials can be greater than 1, greater than about 2, greater than about 3, greater than about 4, greater than about 5, greater than about 6, greater than about 7, greater than about 8, greater than about 9, greater than about 10, or greater than about 15 layers, inclusive of all values and ranges therebetween. In some embodiments, a first layer can be disposed onto a current collector, a second layer can be disposed onto the first layer, and subsequent layers can be disposed upon previous layers until a top layer is disposed to form the finished electrode. In some embodiments, a first one or more layers can be coupled with a second one or more other layers in any suitable order and using any suitable method, and the coupled layers can be disposed onto the current collector simultaneously to form the finished electrode. In some embodiments, a single electrode material can be formed on the current collector that has a compositional gradient (anisotropy) across the electrode thickness.

FIG. 1 is a schematic illustration of an electrode 100 including a first electrode material 120 disposed on a current collector 110 and a second electrode material 130 disposed on the first electrode material 120. In some embodiments, the first electrode material 120 and/or the second electrode material 130 can include at least one of solid electrode materials, semi-solid electrode materials, high-capacity materials, and combinations thereof (collectively "electrode materials").

The electrode 100 can be used as a cathode, an anode, or in any other manner in electrochemical devices. In some embodiments, the electrode 100 can include a range of materials and any suitable form factor as described in U.S.

Pat. No. 8,993,159 ("the '159 patent"), filed Apr. 29, 2013, entitled "Semi-Solid Electrodes Having High Rate Capability," the entire disclosure of which is incorporated herein by reference.

Likewise, the current collector 110 can be configured to be used as a cathode current collector, an anode current collector, or for any other purpose as desired. Examples of possible materials, electrochemical compatibility characteristics, form factors, and uses for the current collector 110 are described in further detail in the '159 patent. The current collector 110 can be substantially similar to the current collectors described in the '159 patent, and therefore is not described in detail herein.

In some embodiments, electrode materials can include an active material, a conductive material, an electrolyte, an additive, a binder, and/or combinations thereof. In some embodiments, the active material can be an ion storage material and or any other compound or ion complex that is capable of undergoing Faradaic or non-Faradaic reactions in order to store energy. The active material can also be a multi-phase material including a redox-active solid mixed with a non-redox-active phase, including solid-liquid suspensions, or liquid-liquid multiphase mixtures, including micelles or emulsions having a liquid ion-storage material intimately mixed with a supporting liquid phase. Systems that utilize various working ions can include aqueous systems in which $Li^+$, $Na^+$, or other alkali ions are the working ions, even alkaline earth working ions such as $Ca^{2+}$, $Mg^{2+}$, or $Al^{3+}$. In some embodiments, a negative electrode storage material and a positive electrode storage material may be electrochemically coupled to form the electrochemical cell, the negative electrode storing the working ion of interest at a lower absolute electrical potential than the positive electrode. The cell voltage can be determined approximately by the difference in ion-storage potentials of the two ion-storage electrode materials.

Electrochemical cells employing negative and/or positive ion-storage materials that are insoluble storage hosts for working ions may take up or release the working ion while all other constituents of the materials remain substantially insoluble in the electrolyte. In some embodiments, these cells can be particularly advantageous as the electrolyte does not become contaminated with electrochemical composition products. In addition, cells employing negative and/or positive lithium ion-storage materials may be particularly advantageous when using nonaqueous electrochemical compositions.

In some embodiments, the ion-storing redox compositions include materials proven to work in conventional lithium-ion batteries. In some embodiments, the positive semi-solid electroactive material contains lithium positive electroactive materials and the lithium cations are shuttled between the negative electrode and positive electrode, intercalating into solid, host particles suspended in a liquid electrolyte. In some embodiments, the lithium cations can intercalate into the solid matrix of a solid high-capacity material.

In some embodiments, the redox-active compound can be organic or inorganic, and can include but is not limited to lithium metal, sodium metal, lithium-metal alloys, gallium and indium alloys with or without dissolved lithium, molten transition metal chlorides, thionyl chloride, and the like, or redox polymers and organics that can be liquid under the operating conditions of the battery. Such a liquid form may also be diluted by or mixed with another, non-redox-active liquid that is a diluent or solvent, including mixing with such diluents to form a lower-melting liquid phase.

In some embodiments, the redox-active electrode material can include an organic redox compound that stores the working ion of interest at a potential useful for either the positive or negative electrode of a battery. Such organic redox-active storage materials include "p"-doped conductive polymers such as polyaniline or polyacetylene based materials, polynitroxide or organic radical electrodes (such as those described in: H. Nishide et al., Electrochim. *Acta*, 50, 827-831, (2004), and K. Nakahara, et al., *Chem. Phys. Lett.*, 359, 351-354 (2002)), carbonyl based organics, and oxocarbons and carboxylate, including compounds such as $Li_2C_6O_6$, $Li_2C_8H_4O_4$, and $Li_2C_6H_4O_4$ (see for example M. Armand et al., *Nature Materials*, DOI: 10.1038/nmat2372) and organosulfur compounds. In some embodiments, conventional active materials can include cobalt, manganese, nickel-cadmium-manganese, phosphate, lithium manganese oxide, lithium iron phosphate, lithium cobalt oxide, $LiNi_{0.8}Co_{0.15}Al_{0.05}O_2$, lithium nickel manganese oxide (LiNi0.5Mn0.5, LiNi0.5Mn1.5 etc.), lithium nickel cobalt manganese oxide (LiNi1/3Mn1/3Co1/3, etc.), lithium metal, carbon, lithium-intercalated carbon, lithium nitrides, lithium alloys and lithium alloy forming compounds of silicon, bismuth, boron, gallium, indium, zinc, tin, tin oxide, antimony, aluminum, titanium oxide, molybdenum, germanium, manganese, niobium, vanadium, tantalum, gold, platinum, iron, copper, chromium, nickel, cobalt, zirconium, yttrium, molybdenum oxide, germanium oxide, silicon oxide, silicon carbide, and other suitable chemistries.

In some embodiments, the conductive material for electrode materials can include, for example, graphite, carbon powder, pyroloytic carbon, carbon black, carbon fibers, carbon microfibers, carbon nanotubes (CNTs), single walled CNTs, multi walled CNTs, fullerene carbons including "bucky balls," graphene sheets and/or aggregate of graphene sheets, any other conductive material, metal (Cu, Al, powders, etc.), alloys or combination thereof.

In some embodiments, the electrolyte for electrode materials can include a non-aqueous liquid electrolyte that can include polar solvents such as, for example, alcohols or aprotic organic solvents. Numerous organic solvents have been proposed as the components of Li-ion battery electrolytes, notably a family of cyclic carbonate esters such as ethylene carbonate, propylene carbonate, butylene carbonate, and their chlorinated or fluorinated derivatives, and a family of acyclic dialkyl carbonate esters, such as dimethyl carbonate, diethyl carbonate, ethylmethyl carbonate, dipropyl carbonate, methyl propyl carbonate, ethyl propyl carbonate, dibutyl carbonate, butylmethyl carbonate, butylethyl carbonate and butylpropyl carbonate. Other solvents proposed as components of Li-ion battery electrolyte solutions include y-butyrolactone, dimethoxyethane, tetrahydrofuran, 2-methyl tetrahydrofuran, 1,3-dioxolane, 4-methyl-1,3-dioxolane, diethyl ether, sulfolane, methylsulfolane, acetonitrile, propiononitrile, ethyl acetate, methyl propionate, ethyl propionate, dimethyl carbonate, tetraglyme, and the like. In some embodiments, these nonaqueous solvents can be used as multi-component mixtures, into which a salt is dissolved to provide ionic conductivity. In some embodiments, salts to provide lithium conductivity can include $LiClO_4$, $LiPF_6$, $LiBF_4$, LiFSI, $LiAsF_6$, LiTFSI, LiBETI, LiBOB, and the like. In some embodiments, electrochemical cells can include a selectively permeable membrane is configured to isolate electrolyte molecules on the cathode side from electrolyte molecules on the anode side. This selectively permeable membrane can allow for the use of multiple electrolytes (i.e., an anolyte on the anode side and a catholyte on the cathode side), as described in U.S. patent application Ser.

No. 16/242,849 entitled, "Electrochemical Cells Including Selectively Permeable Membranes, Systems and Methods of Manufacturing the Same," filed Jan. 8, 2019 ("the '849 application"), the disclosure of which is incorporated herein by reference in its entirety.

In some embodiments, the binder can include starch, carboxymethyl cellulose (CMC), diacetyl cellulose, hydroxypropyl cellulose, ethylene glycol, polyacrylates, poly(acrylic acid), polytetrafluoroethylene, polyimide, polyethylene-oxide, poly(vinylidene fluoride), rubbers, ethylene-propylene-diene monomer (EPDM), hydrophilic binders, polyvinylidene fluoride (PVDF), styrene butadiene copolymers, poly (3,4-ethylene dioxythiophene):poly (styrene sulfonate) (PEDOT:PSS), Poly(vinylidene fluoride-co-hexafluoropropylene) (PVDF-HFP), maleic anhydride-grated-polyvinylidene fluoride (MPVDF), styrene butadiene rubber (SBR), mixtures of SBR and sodium carboxymethyl cellulose (SBR+CMC), polyacrylonitrile, fluorinated polyimide, poly(3-hexylthiophene)-b-poly(ethylene oxide), poly (1-pyrenemethyl methacrylate) (PPy), poly (1-pyrenemethyl methacrylate-co-methacrylic acid) (PPy-MAA), poly (1-pyrenemethyl methacrylate-co-triethylene glycol methyl ether) (PPyE), polyacrylic acid and this lithium salt(PAA), sodium polyacrylate, fluorinated polyacrylate, polyimide (PI), polyamide imide (PAI), polyether imide (PEI), other suitable polymeric materials configured to provide sufficient mechanical support for the electrode materials, and combinations thereof. In some embodiments, the electrode materials can include between about 0.01 wt % to about 30 wt % of the binder, about 1 wt % to about 20 wt %, about 2 wt % to about 19 wt %, about 3 wt % to about 18 wt %, about 4 wt % to about 17 wt %, about 5 wt % to about 16 wt %, about 6 wt % to about 15 wt %, or about 5 wt % to about 20 wt %, inclusive of all values and ranges therebetween.

In some embodiments, the thickness of the electrode 100 can be at least about 30 µm. In some embodiments, the thickness of the semi-solid electrodes can be at least about 100 µm, at least about 150 µm, at least about 200 µm, at least about 250 µm, at least about 300 µm, at least about 350 µm, at least about 400 µm, at least about 450 µm, at least about 500 µm, at least about 600 µm, at least about 700 µm, at least about 800 µm, at least about 900 µm, at least about 1,000 m, at least about 1,500 µm, and up to about 2,000 µm, inclusive of all thicknesses therebetween. In some embodiments, the thickness of the first electrode material 120 can be less than about 50% of the total thickness of the electrode 100. In some embodiments, the thickness of the first electrode material 120 can be less than about 45%, less than about 40%, less than about 35%, less than about 30%, less than about 25%, less than about 20%, less than about 15%, less than about 10%, less than about 5%, or less than about 3% of the total thickness of the electrode 100. In some embodiments, the thickness of the first electrode material 120 can be less than about 80 µm, less than about 70 µm, less than about 60 µm, less than about 50 µm, less than about 40 µm, less than about 30 µm, less than about 20 µm, less than about 10 µm, less than about 5 µm, less than about 2 µm, or less than about 1 µm.

In some embodiments, the thickness of the second electrode material 130 can be at least about 20% of the total thickness of the electrode 100. In some embodiments, the thickness of the second electrode material 130 can be at least about 50%, at least about 60%, at least about 70%, at least about 80%, at least about 90%, at least about 95%, at least about 97%, at least about 98%, or at least about 99% of the total thickness of the electrode 100. In some embodiments, the thickness of the second electrode material 120 can be at least about 30 µm. In some embodiments, the thickness of the second electrode material 120 can be at least about 50 µm, at least about 100 m, at least about 150 µm, at least about 200 µm, at least about 250 µm, at least about 300 µm, at least about 350 µm, at least about 400 µm, at least about 450 µm, at least about 500 µm, at least about 600 µm, at least about 700 µm, at least about 800 µm, at least about 900 µm, at least about 1,000 µm, at least about 1,500 µm, and up to about 2,000 µm, inclusive of all thicknesses therebetween.

In some embodiments, the first electrode material 120 can include solid electrode materials manufactured according to conventional solid electrode manufacturing processes. In some embodiments, the solid electrode materials can be manufactured by forming a slurry that includes the active material, the conductive additive, and the binding agent dissolved or dispersed in a solvent. After the slurry is disposed to the electrode current collector or other suitable structure within the electrochemical cell, the slurry is dried (e.g., by evaporating the solvent) and calendered to a specified thickness. The manufacture of solid electrode materials can also commonly include material mixing, casting, calendering, drying, slitting, and working (bending, rolling, etc.) according to the battery architecture being built. Once the electrode materials are dried and calendered, the electrode materials can be wetted with the electrolyte (e.g., under pressure).

In some embodiments, the first electrode material 120 can include solid electrode materials manufactured by deposition processes, which includes vapor deposition, electric beam deposition, electrochemical deposition, sol-gel, sputtering, and physical spray method.

In some embodiments, the second electrode material 130 can include pure conductive agent dispersed on the first electrode material 120. Coating a conductive slurry (without any active materials) on the first electrode material 120 as an electrolyte serves as an alternative method for electrolyte ejection in traditional cell production process. The conductive agent can flow into the first electrode material 120 during the cycling, especially with the volume expansion materials, to fill in the void space. In other words, the use of a conductive agent can help maintain the electrode's electronic conductivity thereby improving cycling stability of the first electrode material 120.

In some embodiments, the second electrode material 130 can include semi-solid electrode materials. In some embodiments, semi-solid electrode materials described herein can be made: (i) thicker (e.g., greater than 250 µm-up to 2,000 µm or even greater) than solid electrode materials due to the reduced tortuosity and higher electronic conductivity of the semi-solid electrode, (ii) with higher loadings of active materials than conventional electrode materials, and (iii) with a simplified manufacturing process utilizing less equipment. These relatively thick semi-solid electrodes decrease the volume, mass and cost contributions of inactive components with respect to active components, thereby enhancing the commercial appeal of electrodes including the semi-solid electrode materials. In some embodiments, the second electrode material 130 can be disposed onto the first electrode material 120 in the absence of a drying step. Removal of the drying step can potentially reduce the processing time and cost of production. In some embodiments, the second electrode material 130 can be disposed onto a separator (not shown) and then the separator with the second electrode material 130 can be combined with the first electrode material 120 disposed on the current collector 110. In some embodiments, the second electrode material 130 can include a binder. In some embodiments, the second electrode material 130 can be substantially free of binder.

In some embodiments, the semi-solid electrode materials described herein can be binderless. Instead, the volume of the semi-solid electrode materials normally occupied by binders in conventional electrodes, is now occupied by: 1) electrolyte, which has the effect of decreasing tortuosity and increasing the total salt available for ion diffusion, thereby countering the salt depletion effects typical of thick conventional electrodes when used at high rate, 2) active material, which has the effect of increasing the charge capacity of the battery, or 3) conductive additive, which has the effect of increasing the electronic conductivity of the electrode, thereby countering the high internal impedance of thick conventional electrodes. The reduced tortuosity and a higher electronic conductivity of the semi-solid electrodes described herein, results in superior rate capability and charge capacity of electrochemical cells formed from the semi-solid electrodes.

Since the semi-solid electrode materials described herein can be made substantially thicker than conventional electrode materials, the ratio of active materials to inactive materials can be much higher. In some embodiments, this increased active to inactive material ratio can increase the overall charge capacity and energy density of a battery that includes the semi-solid electrode materials described herein.

As described herein, solid electrode materials are typically denser (having a lower porosity) while semi-solid electrode materials are typically less dense (having a higher porosity). Without wishing to be bound by any particular theory, the lower porosity of the solid electrode materials may result in a lower probability of ion conductance to available active material due to increased ionic tortuosity across the electrode thickness. In some embodiments, the first electrode material 120 can include solid electrode materials and the second electrode material 130 can include semi-solid electrode materials such that the compositional gradient across the electrode thickness includes a change in porosity. Without wishing to be bound by any particular theory, by creating a porosity gradient across the thickness of the electrode 100, the total theoretical energy density of the electrode 100 is higher due to the use of the conventional electrode materials and the accessibility of the conventional active material to ions remains high due to high ionic flux across the semi-solid electrode material.

In some embodiments, while the first electrode material 120 is described as including solid electrode materials and the second electrode material 130 is described as including semi-solid electrode materials, other configurations and chemistries are possible. For example, in some embodiments, the first electrode material 120 can include a semi-solid electrode material having a first composition and the second electrode material 130 can include a semi-solid electrode material having a second composition. In some embodiments, the first electrode material 120 can include a semi-solid electrode material having a first porosity and the second electrode material 130 can include a semi-solid electrode material having a second porosity greater than the first porosity. In some embodiments, the first electrode material 120 can include semi-solid electrode materials having a first ion storage capacity and the second electrode material 130 can include semi-solid electrode materials having a second ion storage capacity less than the first ion storage capacity. In some embodiments, the first electrode material 120 can include semi-solid electrode materials having a first ion conductivity and the second electrode material 130 can include semi-solid electrode materials having a second ion conductivity greater than the first ion conductivity.

In some embodiments, the first electrode material 120 can have a first porosity and the second electrode material 130 can have a second porosity less than the first porosity. In some embodiments, the second porosity can be greater than the first porosity. In some embodiments, the second porosity can be substantially equal to the first porosity.

In some embodiments, the first porosity can be less than about 3% or less than about 5%. In some embodiments, the first porosity can be between about 20% and about 25%, between about 25% and about 30%, between about 30% and about 35%, between about 35% and about 40%, between about 40% and about 45%, between about 45% and about 50%, between about 50% and about 55%, or between about 55% and about 60%.

In some embodiments, the second porosity can be between about 20% and about 25%, between about 25% and about 30%, between about 30% and about 35%, between about 35% and about 40%, between about 40% and about 45%, between about 45% and about 50%, between about 50% and about 55%, or between about 55% and about 60%.

In some embodiments, the first electrode material 120 can have a first surface area and the second electrode material 130 can have a second surface area greater than the first surface area. In some embodiments, the second surface area can be less than the first area. In some embodiments, the second surface area can be substantially equal to the first surface area.

In some embodiments, the first electrode material 120 can include active materials with a surface area less than about 1 $m^2/g$. In some embodiments, the first electrode material 120 can include active materials with a surface area between about 1 $m^2/g$ and about 2 $m^2/g$, between about 2 $m^2/g$ and about 3 $m^2/g$, between about 3 $m^2/g$ and about 4 $m^2/g$, between about 4 $m^2/g$ and about 5 $m^2/g$, or greater than about 5 $m^2/g$.

In some embodiments, the second electrode material 130 can include active materials with a surface area less than about 1 $m^2/g$. In some embodiments, the second electrode material 130 can include active materials with a surface area between about 1 $m^2/g$ and about 2 $m^2/g$, between about 2 $m^2/g$ and about 3 $m^2/g$, between about 3 $m^2/g$ and about 4 $m^2/g$, between about 4 $m^2/g$ and about 5 $m^2/g$, or greater than about 5 $m^2/g$.

In some embodiments, during operation of the electrochemical cell, ions can be shuttled through the second electrode material 130 at a first rate and into the first electrode material 120 at a second rate less than the first rate. In some embodiments, the first electrode material 120 can have a first ion storage capacity and the second electrode material 130 can have a second ion storage capacity less than the first ion storage capacity. In some embodiments, the finished electrode can have a thickness that is substantially equal to the sum of the thickness of the current collector 110, the first electrode material 120, and the third electrode material 130. In some embodiments, the thickness of the finished compositional gradient electrode can have a power density greater than an electrode formed from either the first electrode material 120 alone or the second electrode material 130 alone and having the same thickness as the finished compositional gradient electrode.

In some embodiments, the first electrode material 120 can include higher concentrations than the second electrode material 130 of high expansion active material in charging such as a silicon base (Si, SiO, Si-alloy) and/or a tin base (Sn, SnO, Sn-Alloy), etc.

Higher expansion active materials can transition to small particles after charging and discharging cycles due to expansion-compression forces in cycling. These forces tend to reduce the electron network during cycles, and more high expansion materials near the current collector can secure electron path. In some embodiments, having a semi-solid electrode as the second electrode materials 130 tends to absorb these expansion forces. In some embodiments, having high porosity of a high expandable active material in the first electrode materials 120 allows the semi-sold electrode with higher electron conductive network and less expandable active material in second layer move into the porous area thereby maintaining the electron network.

In some embodiments, the energy density of the finished electrode 100 having a compositional gradient (e.g., including the first electrode material 120 and the second electrode material 130) can be greater than about 0.2 MJ/L, about 0.25 MJ/L, about 0.3 MJ/L, about 0.35 MJ/L, about 0.4 MJ/L, about 0.45 MJ/L, about 0.5 MJ/L, about 0.55 MJ/L, about 0.6 J/L, about 0.65 MJ/L, about 0.7 MJ/L, about 0.75 MJ/L, about 0.8 MJ/L, about 0.85 MJ/L, about 0.9 MJ/L, about 0.95 MJ/L, about 1.0 MJ/L, about 1.05 MJ/L, about 1.1 MJ/L, about 1.15 MJ/L, about 1.2 MJ/L, about 1.25 MJ/L, about 1.3 MJ/L, about 1.35 MJ/L, about 1.4 MJ/L, about 1.45 MJ/L, about 1.5 MJ/L, about 1.55 MJ/L, about 1.6 MJ/L, about 1.65 MJ/L, about 1.7 MJ/L, about 1.75 MJ/L, about 1.8 MJ/L, about 1.85 MJ/L, about 1.9 MJ/L, about 1.95 MJ/L, about 2.0 MJ/L, about 2.05 MJ/L, about 2.1 MJ/L, about 2.15 MJ/L, about 2.2 MJ/L, about 2.25 MJ/L, about 2.3 MJ/L, about 2.35 MJ/L, about 2.4 MJ/L, about 2.45 MJ/L, about 2.5 MJ/L, about 2.55 MJ/L, about 2.6 MJ/L, about 2.65 MJ/L, about 2.7 MJ/L, about 2.75 MJ/L, about 2.8 MJ/L, about 2.85 MJ/L, about 2.9 MJ/L, about 2.95 MJ/L, about 3.0 MJ/L, about 3.5 MJ/L, about 4.0 MJ/L, about 4.5 MJ/L, or about 5.0 MJ/L, inclusive of all values and ranges therebetween.

In some embodiments, the energy density of the first electrode material 120 can be greater than about 0.2 MJ/L, about 0.25 MJ/L, about 0.3 MJ/L, about 0.35 MJ/L, about 0.4 MJ/L, about 0.45 MJ/L, about 0.5 MJ/L, about 0.55 MJ/L, about 0.6 J/L, about 0.65 MJ/L, about 0.7 MJ/L, about 0.75 MJ/L, about 0.8 MJ/L, about 0.85 MJ/L, about 0.9 MJ/L, about 0.95 MJ/L, about 1.0 MJ/L, about 1.05 MJ/L, about 1.1 MJ/L, about 1.15 MJ/L, about 1.2 MJ/L, about 1.25 MJ/L, about 1.3 MJ/L, about 1.35 MJ/L, about 1.4 MJ/L, about 1.45 MJ/L, about 1.5 MJ/L, about 1.55 MJ/L, about 1.6 MJ/L, about 1.65 MJ/L, about 1.7 MJ/L, about 1.75 MJ/L, about 1.8 MJ/L, about 1.85 MJ/L, about 1.9 MJ/L, about 1.95 MJ/L, about 2.0 MJ/L, about 2.05 MJ/L, about 2.1 MJ/L, about 2.15 MJ/L, about 2.2 MJ/L, about 2.25 MJ/L, about 2.3 MJ/L, about 2.35 MJ/L, about 2.4 MJ/L, about 2.45 MJ/L, about 2.5 MJ/L, about 2.55 MJ/L, about 2.6 MJ/L, about 2.65 MJ/L, about 2.7 MJ/L, about 2.75 MJ/L, about 2.8 MJ/L, about 2.85 MJ/L, about 2.9 MJ/L, about 2.95 MJ/L, about 3.0 MJ/L, about 3.5 MJ/L, about 4.0 MJ/L, about 4.5 MJ/L, or about 5.0 MJ/L, inclusive of all values and ranges therebetween.

In some embodiments, the energy density of the second electrode material 130 can be greater than about 0.2 MJ/L, about 0.25 MJ/L, about 0.3 MJ/L, about 0.35 MJ/L, about 0.4 MJ/L, about 0.45 MJ/L, about 0.5 MJ/L, about 0.55 MJ/L, about 0.6 J/L, about 0.65 MJ/L, about 0.7 MJ/L, about 0.75 MJ/L, about 0.8 MJ/L, about 0.85 MJ/L, about 0.9 MJ/L, about 0.95 MJ/L, about 1.0 MJ/L, about 1.05 MJ/L, about 1.1 MJ/L, about 1.15 MJ/L, about 1.2 MJ/L, about 1.25 MJ/L, about 1.3 MJ/L, about 1.35 MJ/L, about 1.4 MJ/L, about 1.45 MJ/L, about 1.5 MJ/L, about 1.55 MJ/L, about 1.6 MJ/L, about 1.65 MJ/L, about 1.7 MJ/L, about 1.75 MJ/L, about 1.8 MJ/L, about 1.85 MJ/L, about 1.9 MJ/L, about 1.95 MJ/L, about 2.0 MJ/L, about 2.05 MJ/L, about 2.1 MJ/L, about 2.15 MJ/L, about 2.2 MJ/L, about 2.25 MJ/L, about 2.3 MJ/L, about 2.35 MJ/L, about 2.4 MJ/L, about 2.45 MJ/L, about 2.5 MJ/L, about 2.55 MJ/L, about 2.6 MJ/L, about 2.65 MJ/L, about 2.7 MJ/L, about 2.75 MJ/L, about 2.8 MJ/L, about 2.85 MJ/L, about 2.9 MJ/L, about 2.95 MJ/L, about 3.0 MJ/L, about 3.5 MJ/L, about 4.0 MJ/L, about 4.5 MJ/L, or about 5.0 MJ/L, inclusive of all values and ranges therebetween.

In some embodiments, the specific energy of the finished electrode 100 having a compositional gradient (e.g., including the first electrode material 120 and the second electrode material 130) can be greater than about 0.2 MJ/kg, about 0.25 MJ/kg, about 0.3 MJ/kg, about 0.35 MJ/kg, about 0.4 MJ/kg, about 0.45 MJ/kg, about 0.5 MJ/kg, about 0.55 MJ/kg, about 0.6 J/kg, about 0.65 MJ/kg, about 0.7 MJ/kg, about 0.75 MJ/kg, about 0.8 MJ/kg, about 0.85 MJ/kg, about 0.9 MJ/kg, about 0.95 MJ/kg, about 1.0 MJ/kg, about 1.05 MJ/kg, about 1.1 MJ/kg, about 1.15 MJ/kg, about 1.2 MJ/kg, about 1.25 MJ/kg, about 1.3 MJ/kg, about 1.35 MJ/kg, about 1.4 MJ/kg, about 1.45 MJ/kg, or about 1.5 MJ/kg, inclusive of all values and ranges therebetween.

In some embodiments, the specific energy of the first electrode material 120 can be greater than about 0.2 MJ/kg, about 0.25 MJ/kg, about 0.3 MJ/kg, about 0.35 MJ/kg, about 0.4 MJ/kg, about 0.45 MJ/kg, about 0.5 MJ/kg, about 0.55 MJ/kg, about 0.6 J/kg, about 0.65 MJ/kg, about 0.7 MJ/kg, about 0.75 MJ/kg, about 0.8 MJ/kg, about 0.85 MJ/kg, about 0.9 MJ/kg, about 0.95 MJ/kg, about 1.0 MJ/kg, about 1.05 MJ/kg, about 1.1 MJ/kg, about 1.15 MJ/kg, about 1.2 MJ/kg, about 1.25 MJ/kg, about 1.3 MJ/kg, about 1.35 MJ/kg, about 1.4 MJ/kg, about 1.45 MJ/kg, or about 1.5 MJ/kg, inclusive of all values and ranges therebetween.

In some embodiments, the specific energy of the second electrode material 130 can be greater than about 0.2 MJ/kg, about 0.25 MJ/kg, about 0.3 MJ/kg, about 0.35 MJ/kg, about 0.4 MJ/kg, about 0.45 MJ/kg, about 0.5 MJ/kg, about 0.55 MJ/kg, about 0.6 J/kg, about 0.65 MJ/kg, about 0.7 MJ/kg, about 0.75 MJ/kg, about 0.8 MJ/kg, about 0.85 MJ/kg, about 0.9 MJ/kg, about 0.95 MJ/kg, about 1.0 MJ/kg, about 1.05 MJ/kg, about 1.1 MJ/kg, about 1.15 MJ/kg, about 1.2 MJ/kg, about 1.25 MJ/kg, about 1.3 MJ/kg, about 1.35 MJ/kg, about 1.4 MJ/kg, about 1.45 MJ/kg, or about 1.5 MJ/kg, inclusive of all values and ranges therebetween.

In some embodiments, the first electrode material 120 can include about 10%, about 20%, about 30%, about 40%, about 50%, about 60%, about 70%, about 80%, about 90%, or about 100% by volume of a high-capacity anode material. In some embodiments, the second electrode material 130 can include a high-capacity anode material combined with carbon, graphite, or other active materials with or without a binder. In some embodiments, the second electrode material 130 can include less than about 60%, less than about 55%, less than about 50%, less than about 45%, less than about 40%, less than about 35%, less than about 30%, less than about 25%, less than about 20%, less than about 15%, less than about 10%, or less than about 5% by volume of high-capacity anode material. In some embodiments, the second electrode material 130 can be substantially free of high-capacity material.

As described above, the electrode 100 includes layers of two different anode materials. In some embodiments, the electrode 100 can alternatively include layers of two or more different cathode materials. In some embodiments, the first electrode material 120 and/or second electrode material 130 can include any material that can be used as a cathode in a lithium-ion battery. Examples of cathode materials that can be used in an electrochemical cell are described the '159 patent incorporated by reference above.

Typically, the current collector 110 in a cathode used in lithium-ion batteries is made from aluminum coated with conductive carbon. The conductive carbon coating can improve electrical conductivity and increase the mechanical strength of the current collector 110, thereby reducing the possibility of cracking of the current collector 110. In some embodiments, the first electrode material 120 can be disposed on a bare aluminum current collector in place of the conductive carbon layer. In some embodiments, the first electrode material 120 in the cathode can be manufactured and/or deposited via the same methods as in the anode, as described above. In some embodiments, the first electrode material 120 of the cathode can have a thickness that is the same or similar to the thickness of the first electrode material 120 of the anode, as described above. In some embodiments, the second electrode material 130 in the cathode can be a semi-solid cathode and can be deposited via the same methods as in the anode, as described above. In some embodiments, the second electrode material 130 of the cathode can have a thickness similar to the thickness of the second electrode material 130 of the anode, as described above.

In some embodiments, the volume percentage of the high-capacity anode material in the second electrode material 130 can be about 10-80% less that the volume percentage of the high-capacity anode material in the first electrode material 120.

In some embodiments, the cycle life of the finished electrode 100 having a compositional gradient (e.g., including the first electrode material 120 and the second electrode material 130) can be greater than about 200 charge/discharge cycles, greater than about 250 cycles, greater than about 300 cycles, greater than about 350 cycles, greater than about 400 cycles, greater than about 450 cycles, greater than about 500 cycles, greater than about 550 cycles, greater than about 600 cycles, greater than about 650 cycles, greater than about 700 cycles, greater than about 750 cycles, greater than about 800 cycles, greater than about 850 cycles, greater than about 900 cycles, greater than about 950 cycles, greater than about 1,000 cycles, greater than about 1,050 cycles, greater than about 1,100 cycles, greater than about 1,250 cycles, greater than about 1,300 cycles, greater than about 1,350 cycles, greater than about 1,400 cycles, greater than about 1,450 cycles, greater than about 1,500 cycles, greater than about 1,550 cycles, greater than about 1,600 cycles, greater than about 1,650 cycles, greater than about 1,700 cycles, greater than about 1,750 cycles, greater than about 1,800 cycles, greater than about 1,850 cycles, greater than about 1,900 cycles, greater than about 1,950 cycles, greater than about 2,000 cycles, greater than about 2,500 cycles, greater than about 3,000 cycles, greater than about 5,000 cycles, or greater than about 10,000 cycles.

In some embodiments, the charge rate of an electrochemical cell including the finished electrode 100 having a compositional gradient (e.g., including the first electrode material 120 and the second electrode material 130) can be less than about 5 hours per 100 g of electrode material at a rate of 1 C, less than about 4.5 hours, less than about 3 hours, less than about 3 hours, less than about 2.5 hours, less than about 2 hours, less than about 1.5 hours, or less than about 1 hour, inclusive of all values and ranges therebetween. In some embodiments, having a semi-solid electrode second electrode material 130 and a conventional (i.e., "dry") first electrode material 120 can avoid the electrolyte filling process, which is usually the last step in conventional battery manufacturing processes. This can also lead to higher loading in the first electrode material 120 by allowing the electrolyte present in the second electrode material 130 to saturate the first electrode material 120.

Pre-Lithiation

Many electrodes, e.g., lithium-ion electrodes, and particularly anodes, can suffer from irreversible capacity loss at the battery formation stage (i.e., the initial cycling step which includes charging and discharging of the electrochemical cell that includes the electrodes). Irreversible capacity loss can occur due to consumption of lithium ions from the cathode active material by the anode, which uses those lithium ions in the formation of the solid-electrolyte interface (SEI) layer. This quantity of consumed lithium becomes unavailable for subsequent use in electric charge storage, and therefore represents an undesirable and irreversible capacity loss. Moreover, this irreversible capacity loss can be accompanied by volumetric expansion of the anode due to the lithium ions being irreversibly trapped in the anode material. This volumetric expansion problem is exacerbated in semi-solid anodes that include high-capacity anode materials (e.g., silicon or tin) in the semi-solid anode formulation, since high-capacity anode materials are capable of incorporating a larger amount of lithium (and enable higher energy cell designs), as compared with conventional materials such as graphite. For example, while graphite can incorporate about 1 lithium atom for every 6 carbon atoms, silicon can theoretically incorporate about 4.4 lithium atoms for every silicon atom.

This higher capacity can allow the formation of electrochemical cells with much higher charge capacity per unit area relative to conventional electrochemical cells, however the higher number of lithium ions incorporated also implies that the semi-solid anodes that include high-capacity materials consume more of the lithium from the cathode to form the SEI layer, leading to an even higher magnitude of the irreversible capacity. Furthermore, silicon experiences substantial volumetric expansion due to the incorporation of the lithium ions into the silicon atoms. The repeated volume changes (i.e., expansion and/or contraction) can negatively impact the charge capacity, and cause irreversible mechanical damage which can reduce the life of the electrochemical cell. Further descriptions of the effects of lithiation on stress and morphology of silicon electrodes can be found in "In situ Measurements of Stress Evolution in Silicon Thin Films During Electrochemical Lithiation and Delithiation," by V. Sethuraman, et al., Journal of Power Sources 195 (2010) 5062-5066, the contents of which are hereby incorporated by reference in their entirety.

In some embodiments, the electrodes described herein can be pre-lithiated electrodes, e.g., pre-lithiated during the mixing of the semi-solid electrode material or pre-lithiated during the assembly of the electrode. In some embodiments, such pre-lithiation may help form the SEI layer in the electrode before electrochemical cell formation and before the first charge/discharge cycle is completed. In some embodiments, pre-lithiation of the electrode can be pre-lithiation of the anode. In some embodiments, pre-lithiation can be carried out by disposing a lithium-containing material into the anode such that lithium ions are stored by the anode active material more readily and earlier in the battery formation process.

Figure 2:
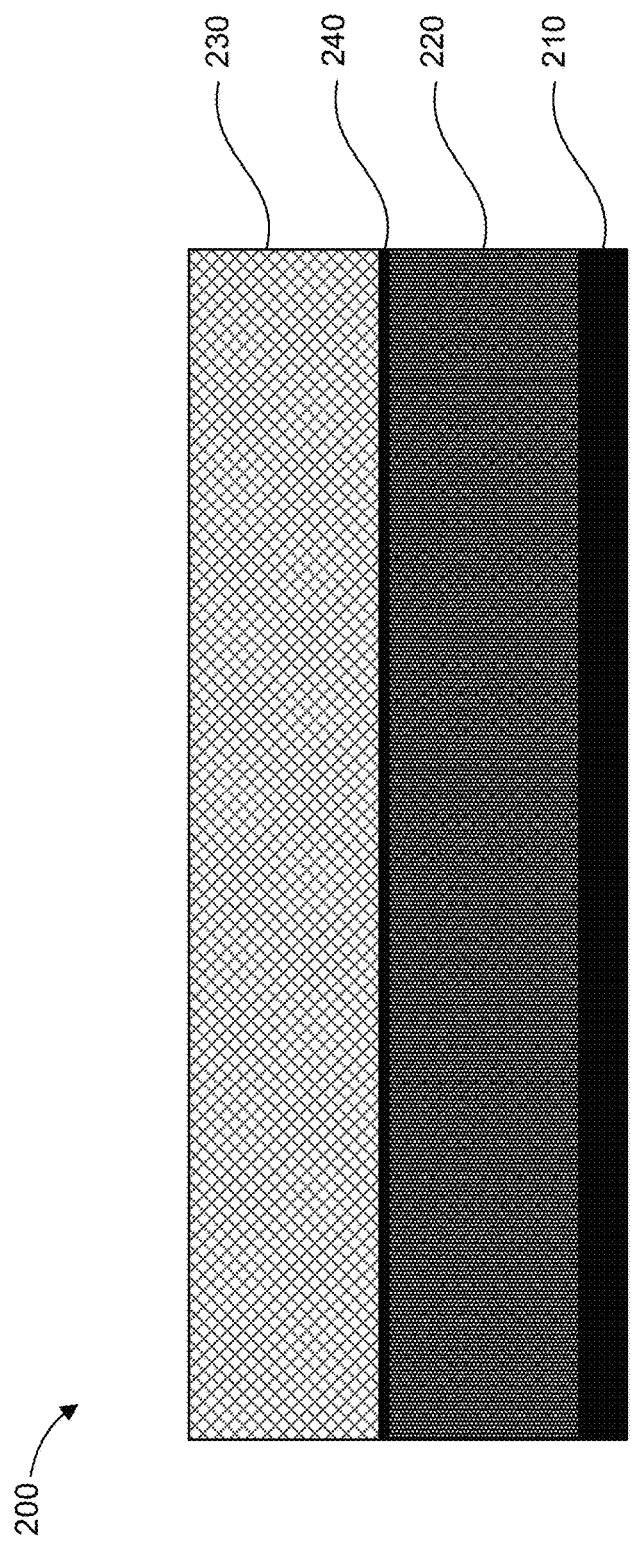
FIG. 2 is a schematic illustration of a multi-layered electrode, according to an embodiment.

FIG. 2 is a schematic illustration of an electrode 200 including a first electrode material 220, a second electrode material 230, and a lithium-containing material 240 disposed on in any suitable order on a current collector 210. In some embodiments, the first electrode material 220 and/or the second electrode material 230 can include at least one of solid electrode materials, semi-solid electrode materials, high-capacity materials, and combinations thereof (collectively "electrode materials"). In some embodiments, the electrode 200 is an anode.

In some embodiments, the electrode materials described herein can be pre-lithiated with the lithium-containing material 240 during the preparation of the electrode 200 and before formation of an electrochemical cell, thereby overcoming, at least in part, the irreversible capacity loss and volumetric expansion problems discussed above. The semi-solid electrode materials described herein allow the mixing of the lithium-containing material into the semi-solid electrode materials. Without wishing to be bound by any particular theory, this may be possible because the semi-solid electrode materials described herein includes the electrolyte mixed into the semi-solid electrode composition. The electrolyte provides a medium for lithium ions provided by the lithium-containing material 240 to interact with the active materials included in the semi-solid electrode materials, particularly the active materials (e.g., graphite) or high-capacity materials (e.g., silicon or tin) included in semi-solid anode materials. This allows the SEI layer to form during the mixing step such that when such the pre-lithiated electrode 200 is paired with a second electrode (not shown; e.g., a cathode) in an electrochemical cell, the lithium ions from the second electrode are not used to form the SEI layer in the pre-lithiated electrode 200. Said another way, because of pre-lithiation, the lithium ions from the second electrode (e.g., cathode) do not contribute to irreversible capacity loss at the pre-lithiated electrode 200. In some embodiments, because the lithium ions from the second electrode do not contribute to irreversible capacity loss at the pre-lithiated electrode 200, this may allow the second electrode (e.g., cathode) to maintain its initial capacity after electrochemical cell formation. Moreover, the electrolyte included in the electrode 200 may also protect the lithium-containing material 240 from the ambient environment (e.g., moisture or humidity of the ambient environment) and thereby, allows the lithium-containing material 240 to remain stable during the mixing process.

In some embodiments, pre-lithiation can be carried out by disposing the lithium-containing material 240 into the electrode 200 at some point during manufacturing of the electrode 200. In some embodiments, the lithium-containing material 240 can be disposed between the first electrode material 220 and the second electrode material 230. In some embodiments, the lithium-containing material 240 can be disposed between the current collector 210 and the first electrode material 220. In some embodiments, the lithium-containing material 240 can be disposed between the second electrode material 230 and a subsequently disposed electrode material layer (not shown). In some embodiments, the lithium-containing material 240 can be disposed between the second electrode material 230 and a separator (not shown) configured to be ion-permeable and separate the electrode 200 from the second electrode.

In some embodiments, the lithium-containing material 240 can be formed according to any suitable form factor, including but not limited to, a sheet, a slurry, a suspension, a plurality of particles, a powder, an alloy solution, and combinations thereof.

In some embodiments, the lithium-containing material 240 can include a lithium metal and a binder. In some embodiments, the lithium-containing material 240 can additionally include a carbonaceous (e.g., graphitic) material. In some embodiments, the lithium-containing material 240 can initially include a solvent that is removed during drying of the electrode materials.

Another advantage provided by pre-lithiation of the semi-solid electrodes described herein is that the anode can be pre-lithiated such that it is completely charged before it is paired with a cathode. This enables the use of cathodes that do not include any available lithium for forming the SEI layer in the anode. Thus, carbon based anode materials can be used instead of lithium metal leading to better cycle stability and safety. Furthermore, intercalation of the lithium ions into high-capacity materials included in the anode can also occur during the mixing step, which allows any expansion of the high-capacity material to occur during the mixing step. Said another way, the pre-lithiation can pre-expand the semi-solid anode such that the semi-solid anode experiences less expansion during electrochemical cell formation and subsequent charge/discharge cycles. In this manner, any physical damage to the electrochemical cell due to the semi-solid anode expansion is substantially reduced or in certain cases possibly eliminated. Thus, electrochemical cells that include such pre-lithiated semi-solid anodes can have substantially higher mechanical stability and longer life compared to anodes (e.g., semi-solid anodes) that are not pre-lithiated.

In some embodiments, additional electrolyte can be added after or during the pre-lithiation processes. In pre-lithiation, the electrolyte is consumed to create SEI, and additional electrolyte will reduce the electrode without electrolyte locally in the electrode.

Additional examples of devices, methods, and systems for the pre-lithiation of electrodes can be found in U.S. Patent Publication No. 2016/0126543 ("the '543 publication"), filed Nov. 3, 2015, entitled "Pre-Lithiation of Electrode Materials in a Semi-Solid Electrode," the entire disclosure of which is incorporated herein by reference.

High-Capacity Materials

In some embodiments, higher energy densities and capacities can be achieved by, for example, improvements in the materials used in the anode and/or cathode, and/or increasing the thickness of the anode/cathode (i.e., higher ratio of active materials to inactive materials). One of the latest materials used in the anode for consumer electronics is, for example, silicon (Si), tin (Sn), silicon alloys, or tin alloys due to their high capacity and low voltage. Typically, this high-capacity active material is mixed with graphite due to its high first charge capacity and related first charge irreversible capacity. Silicon has a first charge theoretical capacity of 4,200 mAh/g and an irreversible capacity of more than 300 mAh/g. Therefore, typical anodes that utilize Si contain a mixture of silicon and graphite in order to reduce the irreversible capacity. In addition, silicon undergoes a very large volume change during lithium insertion causing the volume of the material to grow by more than 300%. To limit this large volumetric expansion, current high-capacity anodes utilize between 10-20% silicon in the anode mixture resulting in anodes with overall capacity of about 700 to about 4,200 mAh/g.

Conventional cathode compositions have capacities of approximately 150-200 mAh/g and cannot be made thicker than 200 μm because conventional electrodes manufactured using the high speed roll-to-roll calendering process tend to delaminate from the flat current collectors if they are made thicker than about 200 μm. Additionally, thicker electrodes have higher cell impedance, which reduces energy efficiency (e.g., as described in Yu et al "Effect of electrode parameters on LiFePO$_4$ cathodes", J. Electrochem. Soc. Vol. 153, A835-A839 (2006)). Therefore, to match the high-capacity anodes with the conventional cathodes, current state-of-the-art batteries have focused on reducing the thickness of the anode. For example, anodes having a thickness of about 40-50 μm and even thinner are being developed. Such thin coatings of these anode materials begin to approach the thickness level of a single graphite particle. The limitation of thickness and associated loading density in conventional coating processes has prevented development of batteries that take full advantage of the high capacity that is available in high energy anodes.

When high-capacity materials are incorporated, e.g., into the electrode 100 or the electrode 200, the related swelling during operation can cause damage to the electrode and to the electrochemical cell comprised therefrom. However, a surprising and unexpected outcome of using the semi-solid electrode materials described herein alongside high-capacity materials in the electrode is that the electrode experiences less damage due to the swelling of the high-capacity materials.

Figure 3:
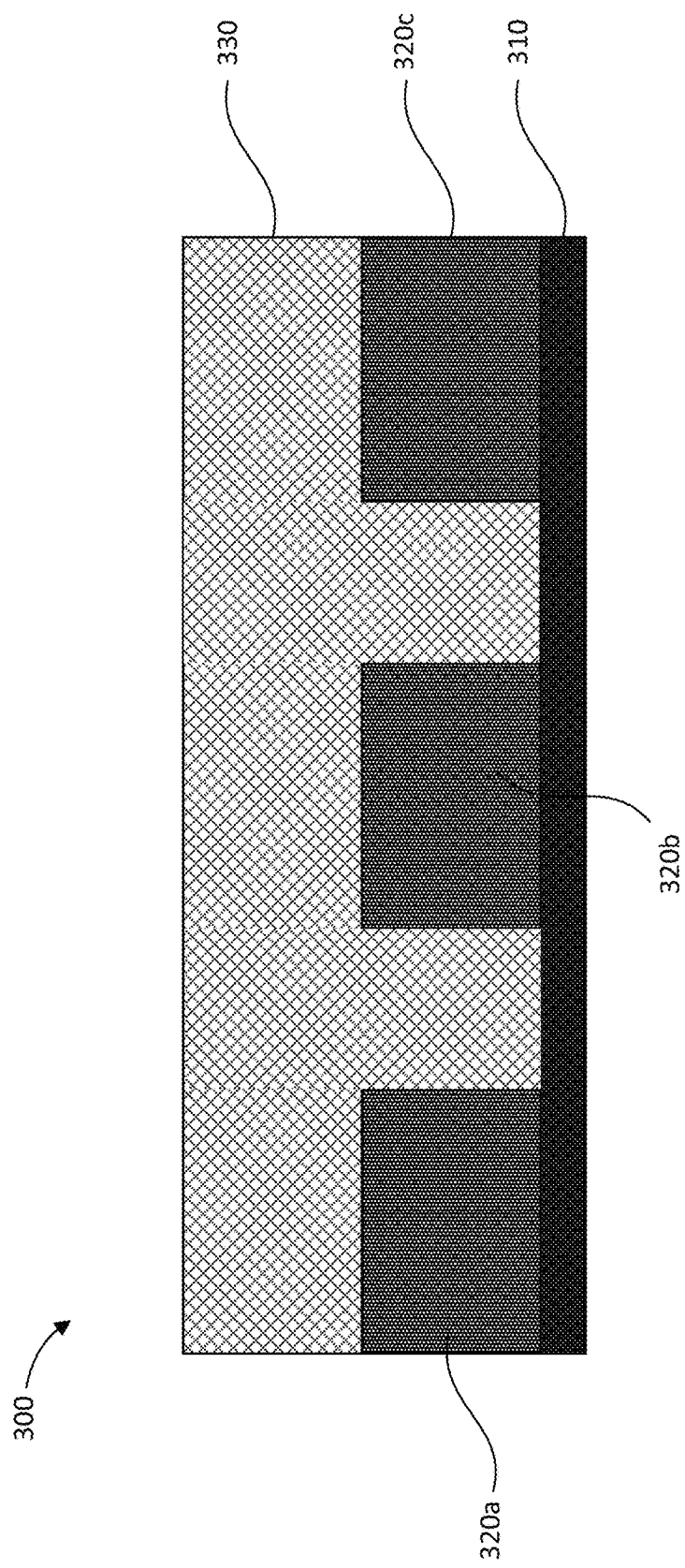
FIG. 3 is a schematic illustration of a multi-layered electrode including expansion areas, according to an embodiment.

FIG. 3 is a side-view illustration of an electrode 300 including a first electrode material 320 disposed on a current collector 310 and a second electrode material 330 disposed on the second electrode material 320. In some embodiments, the first electrode material 320 and/or the second electrode material 330 can include at least one of solid electrode materials, semi-solid electrode materials, high-capacity materials, and combinations thereof (collectively "electrode materials"). In some embodiments, a portion of the first electrode material 320 can be removed (e.g., by laser ablation) to expose a portion of the current collector 310. In some embodiments, the removal of a portion of the first electrode material 320 can form a plurality of expansion areas 330a, 330b, 330c. In some embodiments, when the second electrode material 330 is disposed onto the first electrode material 320, at least a portion of the second electrode material 330 can be interposed within the plurality of expansion areas 330a, 330b, 330c. In some embodiments, rather than removal of portions of the first electrode material 320 to form the plurality of expansion areas 330a, 330b, 330c, the plurality of expansion areas 330a, 330b, 330c can be formed by selective deposition of the first electrode material 320 onto the current collector 310. In some embodiments, the selective deposition of the first electrode material 320 onto the current collector 310 can be accomplished by first disposing a mask material onto the current collector 310, then disposing the first electrode material 320 onto the current collector 310, and removing the mask to define the plurality of expansion areas 330a, 330b, 330c. In some embodiments, at least one of the first electrode material 120 and the second electrode material 130 can include a high-capacity material. In some embodiments, the high-capacity material can have any suitable form factor such as sheet, bulk material, micro-scale particles, nano-scale particles, or combinations thereof. In some embodiments, the high-capacity material can include any material capable of storing ions, including but not limited to silicon, bismuth, boron, gallium, indium, zinc, tin, antimony, aluminum, titanium oxide, molybdenum, germanium, manganese, niobium, vanadium, tantalum, iron, copper, gold, platinum, chromium, nickel, cobalt, zirconium, yttrium, molybdenum oxide, germanium oxide, silicon oxide, silicon carbide, any other high-capacity materials or alloys thereof, and any combination thereof.

In some embodiments, the electrode 300 can include about 66 wt %-70 wt % Si, about 15 wt %-22 wt % Co, and about 4 wt %-12 wt % C. In some embodiments, the electrode 300 can include about 70 wt % Si, about 15 wt %-20 wt % Ni and about 10 wt %-15 wt % C. In some embodiments, the electrode 300 can include about 70 wt % Si, about 15 wt % Fe and about 15 wt % C. In some embodiments, the electrode 300 can include about 70 wt % Si, about 20 wt % Ti, and about 10 wt % C. In some embodiments, the electrode 300 can include about 70 wt % Si, about 15 wt % Mo and about 15 wt % C. In some embodiments, the electrode 300 can include about 70 wt % Si, 15 wt % Co, 5 wt % Ni and about 10 wt % C. In some embodiments, the electrode 300 can include about 70 wt % Si, about 10 wt % Co, about 10 wt % Ni and about 10 wt % C. In some embodiments, the electrode 300 can include about 70 wt % Si, about 5 wt % Co, about 15 wt % Ni and about 10 wt % C. In some embodiments, the electrode 300 can include about 70 wt % Si, about 5 wt % Fe, about 10 wt % Ni and about 15 wt % C. In some embodiments, the electrode 300 can include about 70 wt % Si, 10 wt % Co and about 5 wt % Ni. In some embodiments, the electrode 300 can include about 74 wt % Si, 2 wt % Sn and about 24 wt % Co. In some embodiments, the electrode 300 can include about 73 wt % Si, about 2 wt % Sn and about 25 wt % Ni. In some embodiments, the electrode 300 can include about 70 wt % Si, 10 wt % Fe, about 10 wt % Ti and about 10 wt % Co. In some embodiments, the electrode 300 can include about 70 wt % Si, about 15 wt % Fe, about 5 wt % Ti and about 10 wt % C. In some embodiments, the electrode 300 can include about 74.67 wt % Si, 16 wt % Fe, 5.33 wt % Ti and 4 wt % C. In some embodiments, the electrode 300 can include about 55 wt % Si, 29.3 wt % Al and about 15.7 wt % Fe. In some embodiments, the electrode 300 can include about 70 wt % Si, about 20 wt % C from a precursor and about 10 wt % graphite by weight. In some embodiments, the electrode 300 can include about 55 wt % Si, about 29.3 wt % Al and about 15.7 wt % Fe. In some embodiments, the electrode 300 can include about 60-62 wt % Si, about 16-20 wt % Al, about 12-14 wt % Fe, and about 8% Ti. In some embodiments, the electrode 300 can include about 50 wt % Sn, about 27.3 wt %-35.1 wt % Co, about 5 wt %-15 wt % Ti, and about 7.7 wt %-9.9 wt % C. In some embodiments, the electrode 300 can include about 50 wt % Sn, about 39-42.3 wt % Co, and about 7.7-11 wt % C. In some embodiments, the electrode 300 can include about 35-70 mole % Si, about 1-45 mole % Al, about 5-25 mole % transition metal, about 1-15 mole % Sn, about 2-15 mole % yttrium, a lanthanide element, an actinide element or a combination thereof.

In some embodiments, the electrode 300 can include a tin metal alloy such as, for example, a Sn—Co—C, a Sn—Fe—C, a Sn—Mg—C, or a La—Ni—Sn alloy. In some embodiments, the electrode 300 can include an amorphous oxide such as, for example, SnO or SiO amorphous oxide. In some embodiments, the electrode 300 can include a glassy anode such as, for example, a Sn—Si—Al—B—O, a Sn—Sb—S—O, a $SnO_2$—$P_2O_5$, or a SnO—$B_2O_3$—$P_2O_5$—$Al_2O_3$ anode. In some embodiments, the electrode 300 can include a metal oxide such as, for example, a CoO, a $SnO_2$, or a $V_2O_5$. In some embodiments, the electrode 300 can include a metal nitride such as, for example, $Li_3N$ or $Li_{2.6}Co_{0.4}N$.

In some embodiments, the electrode 100 including the high-capacity material can be an anode and the first electrode material 120 can include the high-capacity material and the second electrode material 130 can include a semi-solid electrode material. In some embodiments, the portions of the first electrode material 120, including the high-capacity material, removed to form the plurality of expansion areas 330a, 330b, 330c, can be substantially filled by the semi-solid electrode material when the second electrode material 330 is disposed onto the first electrode material 320. Without wishing to be bound by any particular theory, when the electrochemical cell is in operation, the high-capacity material may expand by up to about 400%, causing the first electrode material 320 to expand. In some embodiments, the second electrode material 330 can be configured to be deformed when the first electrode material 320 expands and/or contracts during operation of the electrochemical cell.

Figure 4:
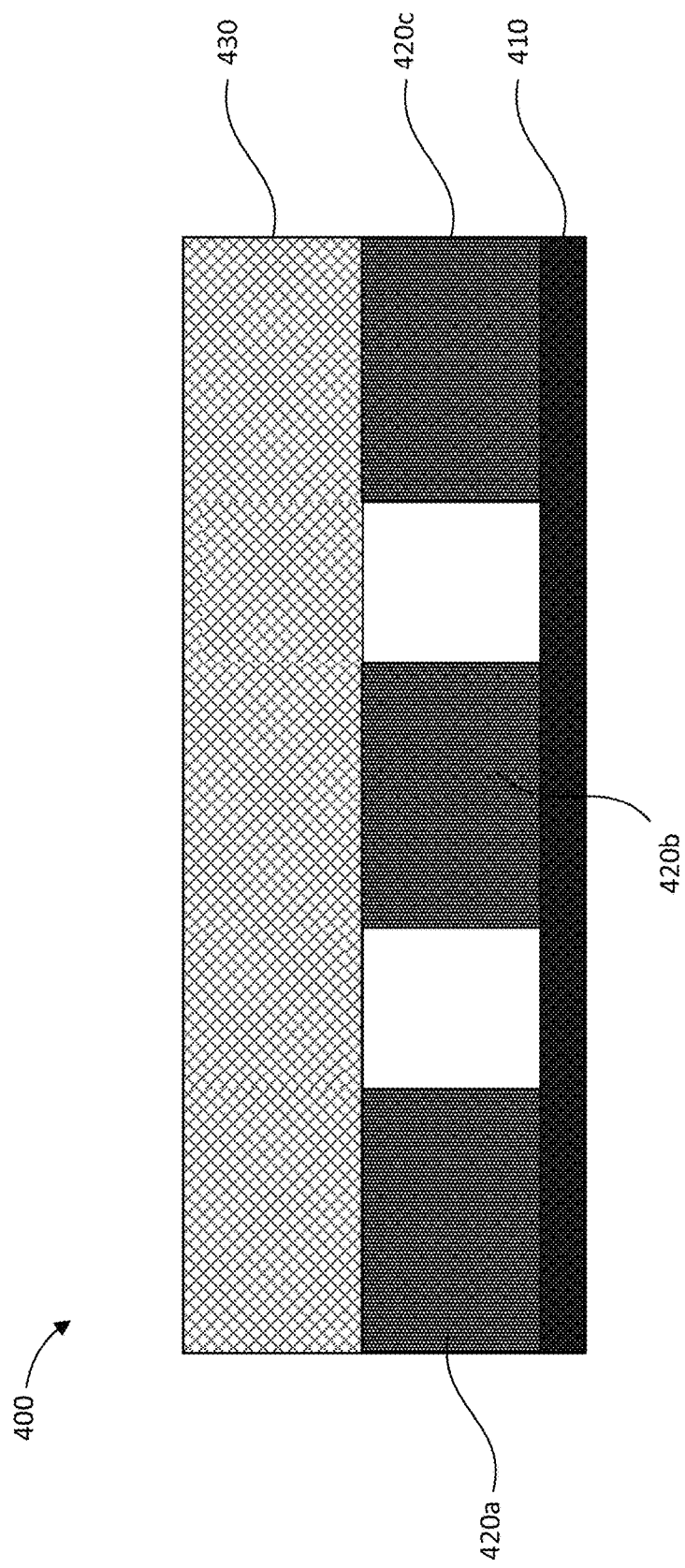
FIG. 4 is a schematic illustration a multi-layered electrode, according to an embodiment.

FIG. 4 illustrates an electrode 400 that includes a current collector 410, a first electrode material 420, and a second electrode material 430. The current collector 410, first electrode material 420, and second electrode material 430 can be substantially similar or the same as the current collector 110, the first electrode material 120, and the second electrode material 130 as described above with reference to FIG. 1, and therefore are not described in detail herein. In some embodiments, the first electrode material 420 can include sputtered or electroplated silicon, while the second electrode material 430 can include a semi-solid electrode material. During operation, the first electrode material 420 (e.g., a sputtered silicon electrode) can develop cracks during cycling and split into multiple distinct portions (e.g. 420a, 420b, 420c). These cracks can potentially restrict electron movement in the horizontal direction (e.g. the x-direction or the y-direction). In other words, the electrons may only be able to efficiently move horizontally within the second electrode material 430. This reduction in electron mobility can cause lower energy density or power density performance in an electrochemical cell that includes the first electrode material 420.

Figure 5:
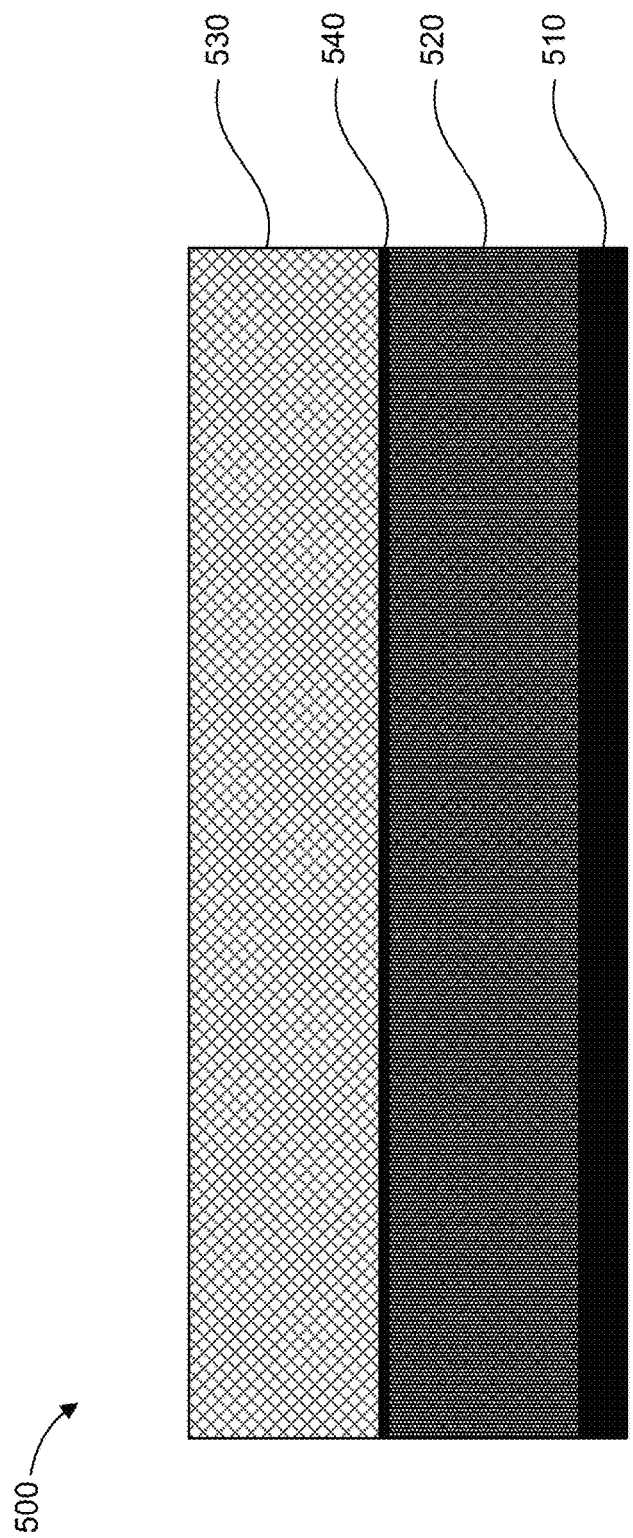
FIG. 5 is a schematic illustration a multi-layered electrode, according to an embodiment.

Referring now to FIG. 5, in some embodiments, an electrode 500 can include a current collector 510, a first electrode material 520, a second electrode material 530, and a third electrode material 540 disposed between the first electrode material 520 and the second electrode material 530. The current collector 510, first electrode material 520, and second electrode material 530 can be substantially similar or the same as the current collector 110, first electrode material 120, and second electrode material 130 as described above with reference to FIG. 1, and therefore are not described in detail herein. In some embodiments, the first electrode material 520 can include sputtered or electroplated silicon. In some embodiments, the third electrode material 540 can include graphite. Components of the first electrode material 520 (e.g., silicon) can continuously react with the electrolyte solution within the electrochemical cell, and controlling the SEI on the surface of the first electrode material 520 can be difficult. In some embodiments where the first electrode material 520 is sputtered or electroplated, the first electrode material 520 has a low porosity (i.e., less surface area for reaction with the electrolyte), however, a chemical reaction may still occur at the interface with the electrolyte. Therefore, coating the first electrode material 520 with a third electrode material 540 that includes, for example, graphite, can minimize these interfacial chemical reactions. In other words, while cracking of the first electrode material 520 can occur in some embodiments, cracking can be minimized or reduce by coating with a third electrode material 540. In addition, conductive materials (e.g., graphite) in the third electrode material 540 and the second electrode material 530 can migrate into the interstitial regions developed from the cracking of the first electrode material 520. The presence of the conductive material in these interstitial regions can facilitate vertical movement (i.e., in the z-direction) of electrons and remedy the performance reduction induced by the cracking of silicon.

Additional examples of electrodes and electrochemical cells including high-capacity materials, and methods of making the same can be found in U.S. Pat. No. 9,437,864, filed Sep. 6, 2016, entitled "Asymmetric Battery Having a Semi-Solid Cathode and High Energy Density Anode," the entire disclosure of which is incorporated herein by reference.

While various embodiments of the system, methods and devices have been described above, it should be understood that they have been presented by way of example only, and not limitation. Where methods and steps described above indicate certain events occurring in certain order, those of ordinary skill in the art having the benefit of this disclosure would recognize that the ordering of certain steps may be modified and such modification are in accordance with the variations of the invention. Additionally, certain of the steps may be performed concurrently in a parallel process when possible, as well as performed sequentially as described above. The embodiments have been particularly shown and described, but it will be understood that various changes in form and details may be made.

Example 1 (Si/Semi-Solid Graphite Vs. Li)

Figure 6:
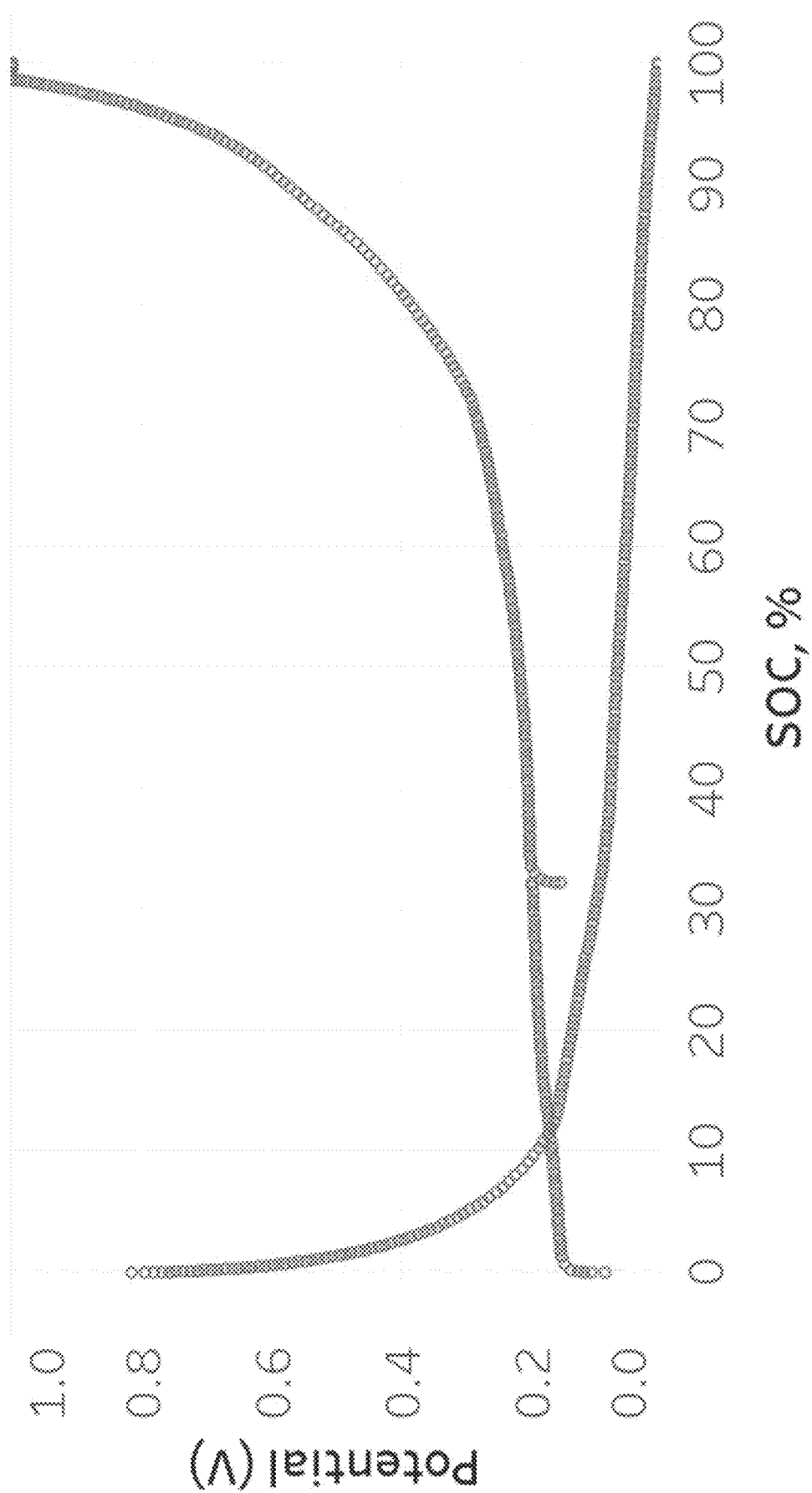
FIG. 6 is a graphical representation of half-cell behavior with a multilayer electrode.

An electrochemical cell Example 1 (also referred to as "Ex 1") was prepared using a semi-solid/Si anode and a Li metal anode. The semi-solid cathode was prepared by mixing 60 vol % graphite powder and 2 vol % carbon conductive additive with an ethylene carbonate/dimethyl carbonate/$LiPF_6$ based electrolyte. The anode slurry was prepared using a roller mill and a centrifuged mixing process. Mixing was performed at 1100 rpm for 2 minutes. The semi-solid slurry had a mixing indentation greater than 0.9 kPa and a conductivity of $1.5 \times 10^{-4}$ S/cm. The slurry was made into an electrode of 250 μm thickness and was tested against a Li metal anode in a pouch cell configuration. The cell was tested using a Maccor battery tester and was cycled between a voltage range of V=0.005 V to 1 V. The cell was charged using a constant current-constant voltage with a constant current rate at C/10. The cell was discharged at C/10. FIG. 6 demonstrates the first cycle of this double layers anode cell.

Example 2 (LiMnPO4/Semi-Solid Cathode Vs. Li)

An electrochemical cell Example 2 (also referred to as "Ex 2") was prepared using a semi-solid NMC/traditional coating LiMnPO4 cathode and a Li metal anode. The first layer of traditional coating LiMnPO4 slurry was made by mixing 80 wt % LiMnPO4, 10 wt % carbon black and 10 wt % PVDF and then diluting with NMP in the centrifuged mixer. Mixing was performed at 1100 rpm for 30 minutes. The NMP containing slurry was casted on the bare Al and then dried to remove the NMP. The dried traditional cathode was then calendered to control the porosity to less than 30%. The semi-solid cathode was prepared by mixing 55 vol %

NMC 811 powder and 2 vol % carbon black with an ethylene carbonate/dimethyl carbonate/LiPF$_6$ based electrolyte The cathode slurry was prepared using a using a centrifuged mixer. Mixing was performed at 1400 rpm for 2 minutes. The semi-solid slurry had a mixing indentation greater than 0.9 kPa and a conductivity of 1.5×10$^{-4}$ S/cm. The slurry was made into an electrode of 250 μm thickness and was tested against a Li metal anode in a pouch cell configuration.

Example 3 (SiO/Hard Carbon Semi-Solid Anode Vs. NMC Semi-Solid Cathode)

An electrochemical cell Example 3 (also referred to as "Ex 3") was prepared using a semi-solid/traditional anode and a Li metal anode. The first layer traditional coating hard carbon slurry was made by mixing 80 wt % hard carbon, 10 wt % carbon black and 10 wt % PVDF and then diluting with NMP in the centrifuged mixer. Mixing was performed at 1100 rpm for 30 minutes. The NMP containing slurry was casted on the nickel foam and then dried to remove the NMP. The dried traditional anode was then calendered to control the porosity to less than 20%. The semi-solid anode was prepared by mixing 40 vol % Silicon monoxide powder and 10 vol % carbon black with an ethylene carbonate/dimethyl carbonate/LiPF$_6$ based electrolyte The anode slurry was prepared using a using a centrifuged mixer. Mixing was performed at 1100 rpm for 30 seconds. The semi-solid slurry had a mixing indentation greater than 0.9 kPa and a conductivity of 1.5×10$^{-4}$ S/cm. The slurry was made into an electrode of 250 μm thickness and was tested against a Li metal anode in a pouch cell configuration.

Example 4 (SiO/Hard Carbon Semi-Solid Anode Vs Semi-Solid Cathode)

Figure 7:
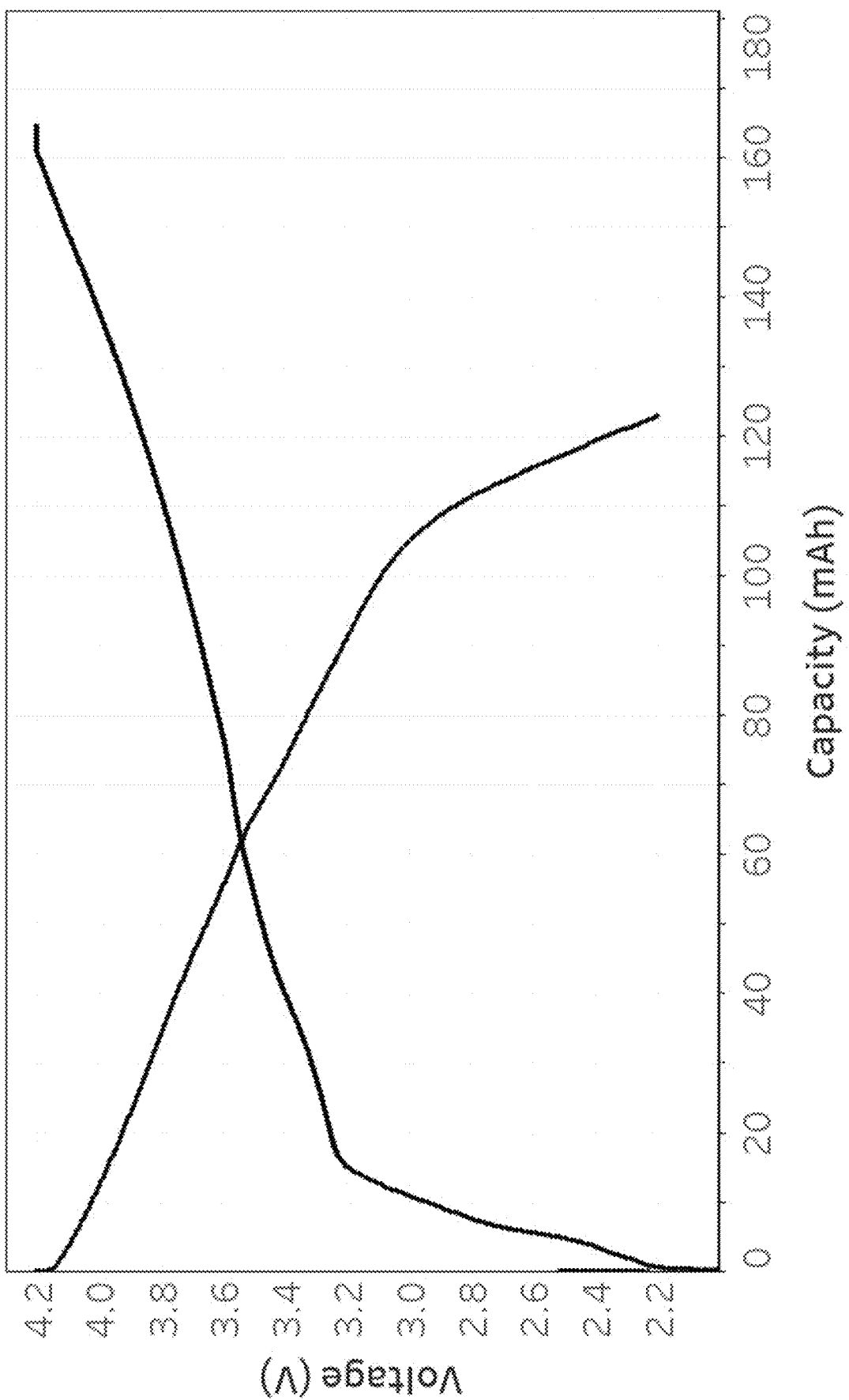
FIG. 7 is a graphical representation of the charge and discharge curves of a cell with a multi-layered electrode.

An electrochemical cell Example 4 (also referred to as "Ex 3") was prepared using a semi-solid/traditional anode and a semi solid nmc cathode. The first layer traditional coating SiO slurry was made by mixing 80 wt % SiO nanowire, 10 wt % carbon black and 20 wt % PVDF and then diluting with NMP in the centrifuged mixer. Mixing was performed at 1100 rpm for 30 minutes. The NMP containing slurry was casted on the copper and then dried to remove the NMP. The dried traditional cathode was then calendered to control the porosity to less than 30%. The semi-solid anode was prepared by mixing 50 vol % graphitepowder and 2 vol % carbon black with an ethylene carbonate/dimethyl carbonate/LiPF$_6$ based electrolyte. The anode slurry was prepared using a using a centrifuged mixer. Mixing was performed at 1100 rpm for 30 seconds. The semi-solid slurry had a mixing indentation greater than 0.9 kPa and a conductivity of 1.5×10$^4$ S/cm. The slurry was made into an electrode of 250 μm thickness and was tested against a Li metal anode in a pouch cell configuration. The semi-solid cathode was prepared by mixing 50 vol % NMC 622 powder and 2 vol % activated carbon with an ethylene carbonate/dimethyl carbonate/LiPF$_6$ based electrolyte. The cathode slurry was prepared using a centrifuged mixer. Mixing was performed at 1400 rpm for 2 minutes. The semi-solid slurry had a mixing indentation greater than 0.9 kPa and a conductivity of 1.5×10$^{-4}$ S/cm. The cathode slurry was made into an electrode of 200 μm thickness. The cell was tested using a Maccor battery tester and was cycled between a voltage range of V=4.2 V to 2.2V. The cell was charged using a constant current-constant voltage with a constant current rate at C/10. The cell was discharged at C/10. FIG. 7 shows the formation curves of this semi-solid cell.

Example 5 (Regular Semi-Solid Cell)

An electrochemical cell Example 5 (also referred to as "Ex 5") was prepared using a semi-solid cathode and a semi-solid graphite anode. The semi-solid cathode was prepared by mixing 50 vol % NMC 811 powder and 2 vol % activated carbon with an ethylene carbonate/dimethyl carbonate/LiPF$_6$ based electrolyte. The cathode slurry was prepared using a centrifuged mixer. Mixing was performed at 1400 rpm for 2 minutes. The semi-solid slurry had a mixing indentation greater than 0.9 kPa and a conductivity of 1.5×10$^{-4}$ S/cm. The cathode slurry was made into an electrode of 200 μm thickness. The cathode was then densified to achieve more than 66 vol % solid loading. The anode graphite semi-solid slurry was prepared by mixing 60 vol % graphite powder and 2 vol % conductive carbon with an ethylene carbonate/dimethyl carbonate/LiPF$_6$ based electrolyte. The slurry using a centrifuged mixer and the mixing was performed at 1100 rpm for 2 minutes. The anode slurry was made into an electrode of 250 μm thickness.

Example 6 (Semi-Solid Cathode Vs. Semi-Solid/Si)

An electrochemical cell Example 6 (also referred to as "Ex 6") was prepared using a semi-solid cathode and a 2-layer semi-solid graphite/sputtered Si anode. The semi-solid cathode was prepared by mixing 50 vol % NMC 811 powder and 2 vol % activated carbon with an ethylene carbonate/dimethyl carbonate/LiPF$_6$ based electrolyte. The cathode slurry was prepared using a using a centrifuged mixer. Mixing was performed at 1400 rpm for 2 minutes. The semi-solid slurry had a mixing indentation greater than 0.9 kPa and a conductivity of 1.5×10$^{-4}$ S/cm. The cathode slurry was made into an electrode of 200 μm thickness. The cathode was then densified to achieve more than 66 vol % solid loading. The first layer of Si was sputtered on the copper using a sputtering machine at a controlled thickness at 2 μm. The anode second layer of graphite in a semi-solid slurry was prepared by mixing 60 vol % graphite powder and 2 vol % conductive carbon with an ethylene carbonate/dimethyl carbonate/LiPF$_6$ based electrolyte. The slurry was mixed using a centrifuged mixer and the mixing was performed at 1100 rpm for 2 minutes. The anode slurry was casted onto a sputtered Si electrode of 250 μm thickness.

Example 7 (Semi-Solid Si-Graphite/Sputtered Si)

An electrochemical cell Example 7 (also referred to as "Ex 7") was prepared using a semi-solid cathode and a 2-layer semi-solid Si-graphite/sputtered Si anode. The semi-solid cathode was prepared by mixing 50 vol % NMC 811 powder and 2 vol % activated carbon with an ethylene carbonate/dimethyl carbonate/LiPF$_6$ based electrolyte. The cathode slurry was prepared using a using a centrifuged mixer. Mixing was performed at 1400 rpm for 2 minutes. The semi-solid slurry had a mixing indentation greater than 0.9 kPa and a conductivity of 1.5×10$^{-4}$ S/cm. The cathode slurry was made into an electrode of 200 μm thickness. The cathode was then densified to achieve more than 66 vol % solid loading. The first layer of Si was sputtered on the copper using a sputtering machine at a controlled thickness at 2 μm. The anode second layer of graphite in a semi-solid slurry was prepared by mixing 40 vol % graphite powder, 20 vol % agglomerated Si and 2 vol % conductive carbon with an ethylene carbonate/dimethyl carbonate/LiPF$_6$ based electrolyte. The slurry was mixed using a centrifuged mixer and the mixing was performed at 1100 rpm for 2 minutes. The anode slurry was casted onto a sputtered Si electrode of 200 µm thickness.

The Ex 5 cell is compared with Ex 6 and Ex 7 cells in Table 1. Table 1 presents the beginning-of-life (BOL) energy densities and specific energies for cells with a semi-solid graphite anode, a 2-layer semi-solid graphite/sputtered Si anode, and a 2-layer semi-solid Si-graphite/sputtered Si anode. The addition of high-capacity materials to the electrode brings significant improvements in capacity. A 6% improvement is achieved via the use of a 2-layer semi-solid graphite/sputtered Si anode, while a 21% improvement is achieved by the use a 2-layer semi-solid Si-graphite/sputtered Si anode.

TABLE 1

BOL Energy Density and Specific Energy of Ex 5, Ex 6, and Ex 7 cells

| Structure | Ex 5 | Ex 6 | Ex 7 |
| --- | --- | --- | --- |
| BOL Energy density (Wh/L) | 620 | 657 | 751 |
| BOL Specific Energy (Wh/kg) | 284 | 310 | 325 |

Example 8 (Semi-Solid Traditional Casted Silicon Anode Vs. Semi-Solid Cathode)

An electrochemical cell Example 8 (also referred to as "Ex 8") was prepared using a semi-solid cathode and a 2-layer semi-solid graphite/traditional Si anode. The semi-solid cathode was prepared by mixing 50 vol % NMC 811 powder and 2 vol % activated carbon with an ethylene carbonate/dimethyl carbonate/LiPF$_6$ based electrolyte. The cathode slurry was prepared using a using a centrifuged mixer. Mixing was performed at 1400 rpm for 2 minutes. The semi-solid slurry had a mixing indentation greater than 0.9 kPa and a conductivity of 1.5×10$^{-4}$ S/cm. The cathode slurry was made into an electrode of 200 µm thickness. The first layer of a traditional coating Si nanoparticle slurry was made by mixing 70 wt % Si, 5 wt % carbon black and 15 wt % Polyimide binder and then diluting with NMP in the centrifuged mixer. Mixing was performed at 1100 rpm for 30 minutes. The NMP containing slurry was casted on the copper and then dried to remove the NMP. The dried traditional cathode was then calendered to control the porosity to less than 30%. The first layer had a thickness of 40 µm. The anode second layer graphite semi-solid slurry was prepared by mixing 53 vol % graphite powder and 2 vol % conductive carbon with an ethylene carbonate/dimethyl carbonate/LiPF$_6$ based electrolyte. The slurry using a centrifuged mixer and the mixing was performed at 1100 rpm for 2 minutes. The anode slurry was casted onto a Si electrode of 250 µm thickness.

Example 9 (Semi-Solid Graphite-Sputtered Silicon Anode Vs. Semi-Solid Cathode)

An electrochemical cell Example 9 (also referred to as "Ex 9") was prepared using a Semi-solid cathode and a 2-layer semi-solid graphite/sputtered Si anode. The semi-solid cathode was prepared by mixing 50 vol % NMC 811 powder and 2 vol % activated carbon with an ethylene carbonate/dimethyl carbonate/LiPF$_6$ based electrolyte. The cathode slurry was prepared using a using a centrifuged mixer. Mixing was performed at 1400 rpm for 2 minutes. The semi-solid slurry had a mixing indentation greater than 0.9 kPa and a conductivity of 1.5×10$^{-4}$ S/cm. The cathode slurry was made into an electrode of 200 µm thickness. The first layer of Si was sputtered on the copper using a sputtering machine at a controlled thickness at 2 µm. The anode second layer graphite semi-solid slurry was prepared by mixing 53 vol % graphite powder and 2 vol % conductive carbon with an ethylene carbonate/dimethyl carbonate/LiPF$_6$ based electrolyte. The slurry using a centrifuged mixer and the mixing was performed at 1100 rpm for 2 minutes. The anode slurry was casted onto a Si electrode of 250 µm thickness.

Figure 8:
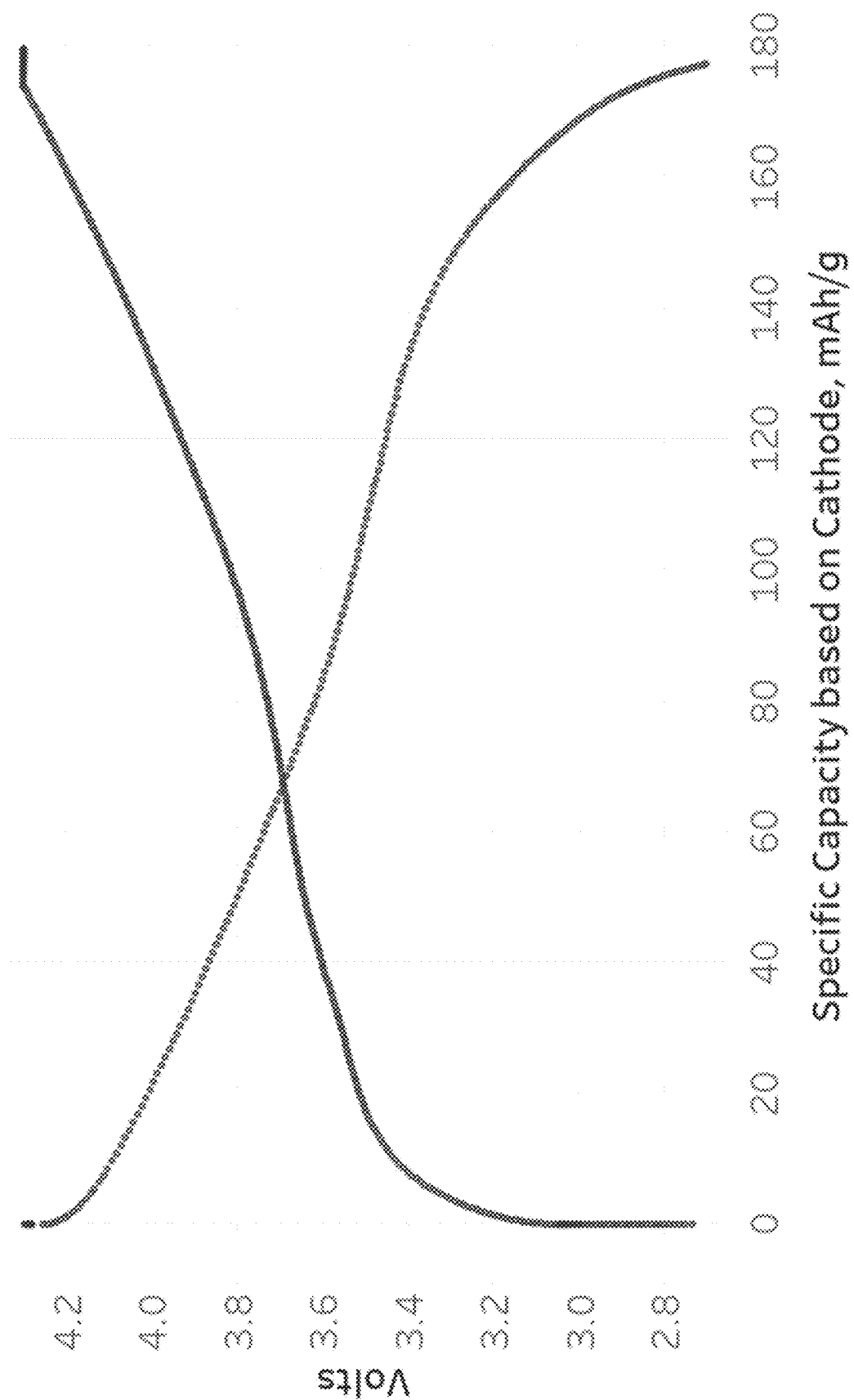
FIG. 8 is a graphical representation of the charge and discharge curves of a cell with a multi-layered electrode.
Figure 9:
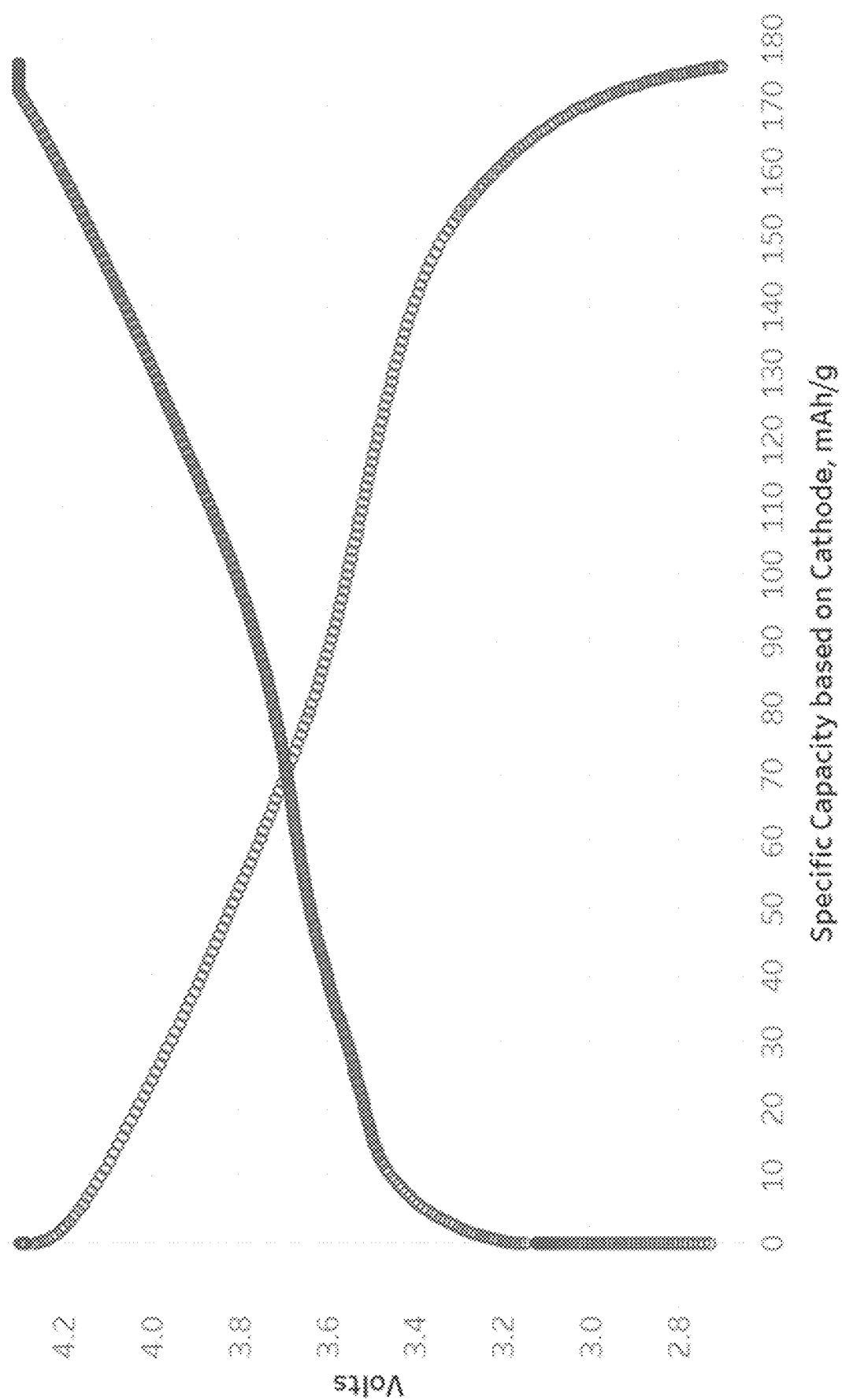
FIG. 9 is a graphical representation of the charge and discharge curves of a cell with a multi-layered electrode.

FIG. 8 presents a voltage vs. specific capacity plot for the first charge and discharge of the Ex 8 cell. FIG. 9 presents a voltage vs. specific capacity plot for the first charge and discharge of the Ex 9 cell. Both cells were discharged from 4.3 V to 2.7 V. The charge rate was C/20 and the discharge rate was C/10.

Figure 10:
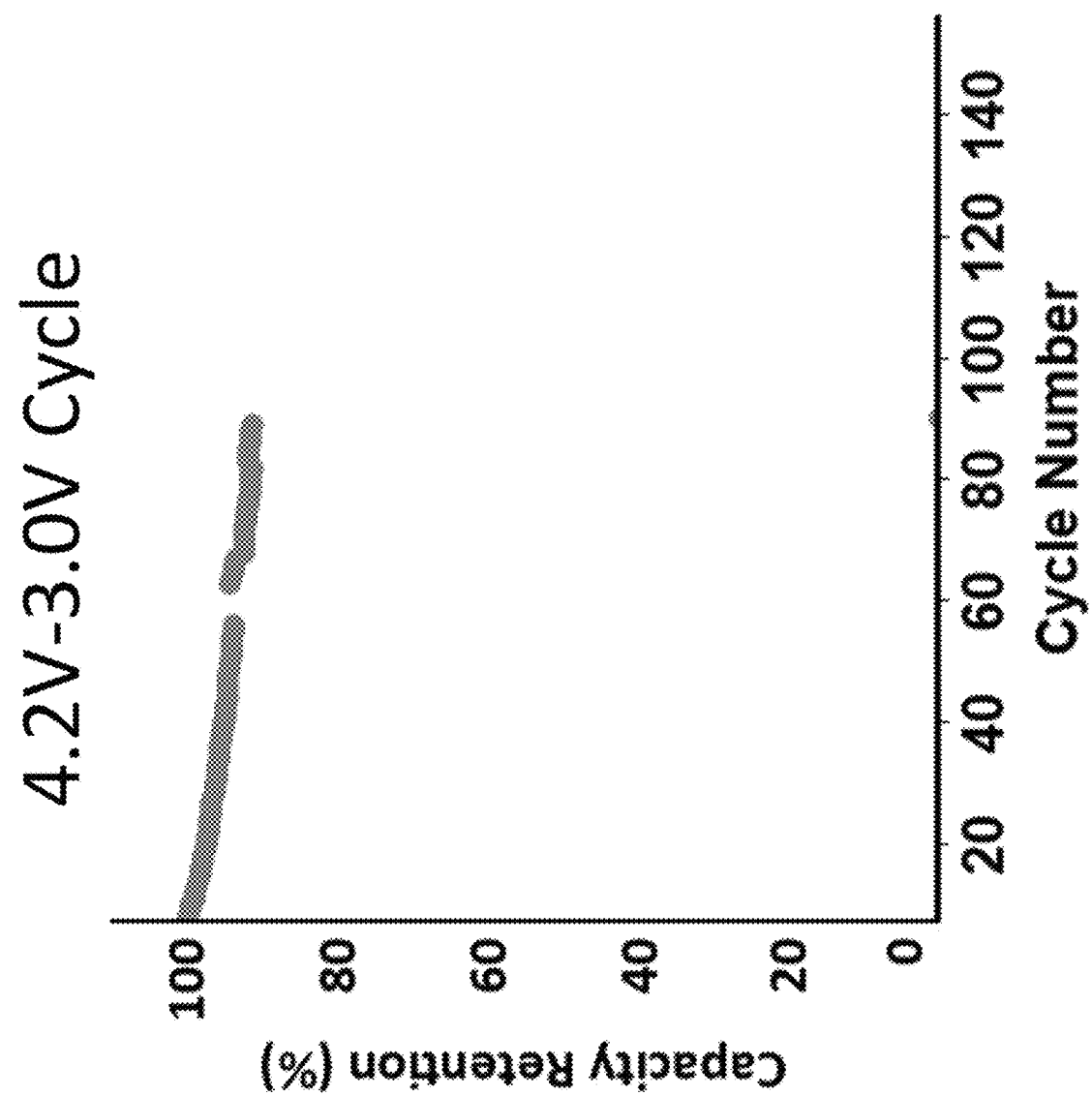
FIG. 10 is a graphical representation of capacity retention of a cell with a multi-layered electrode.
Figure 11:
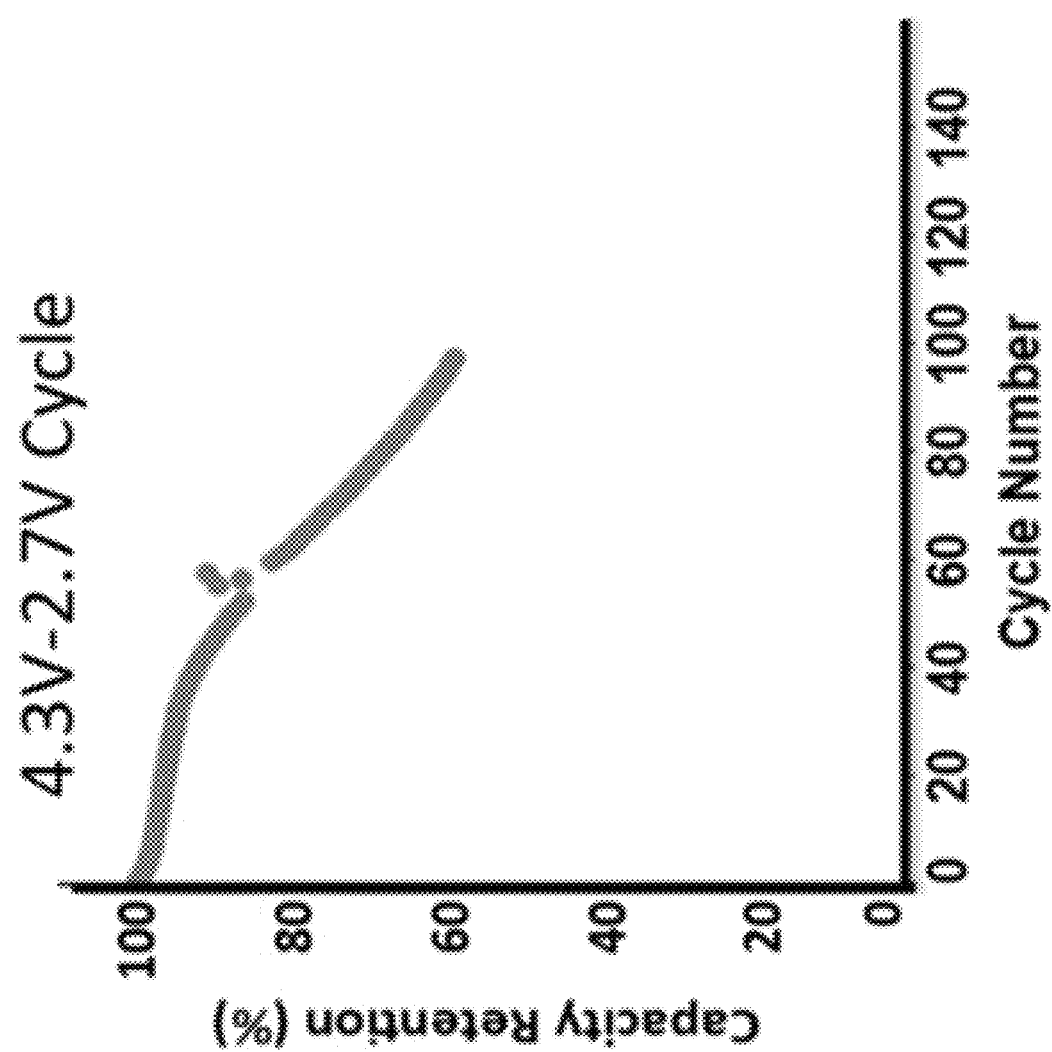
FIG. 11 is a graphical representation of capacity retention of a cell with a multi-layered electrode.
Figure 12:
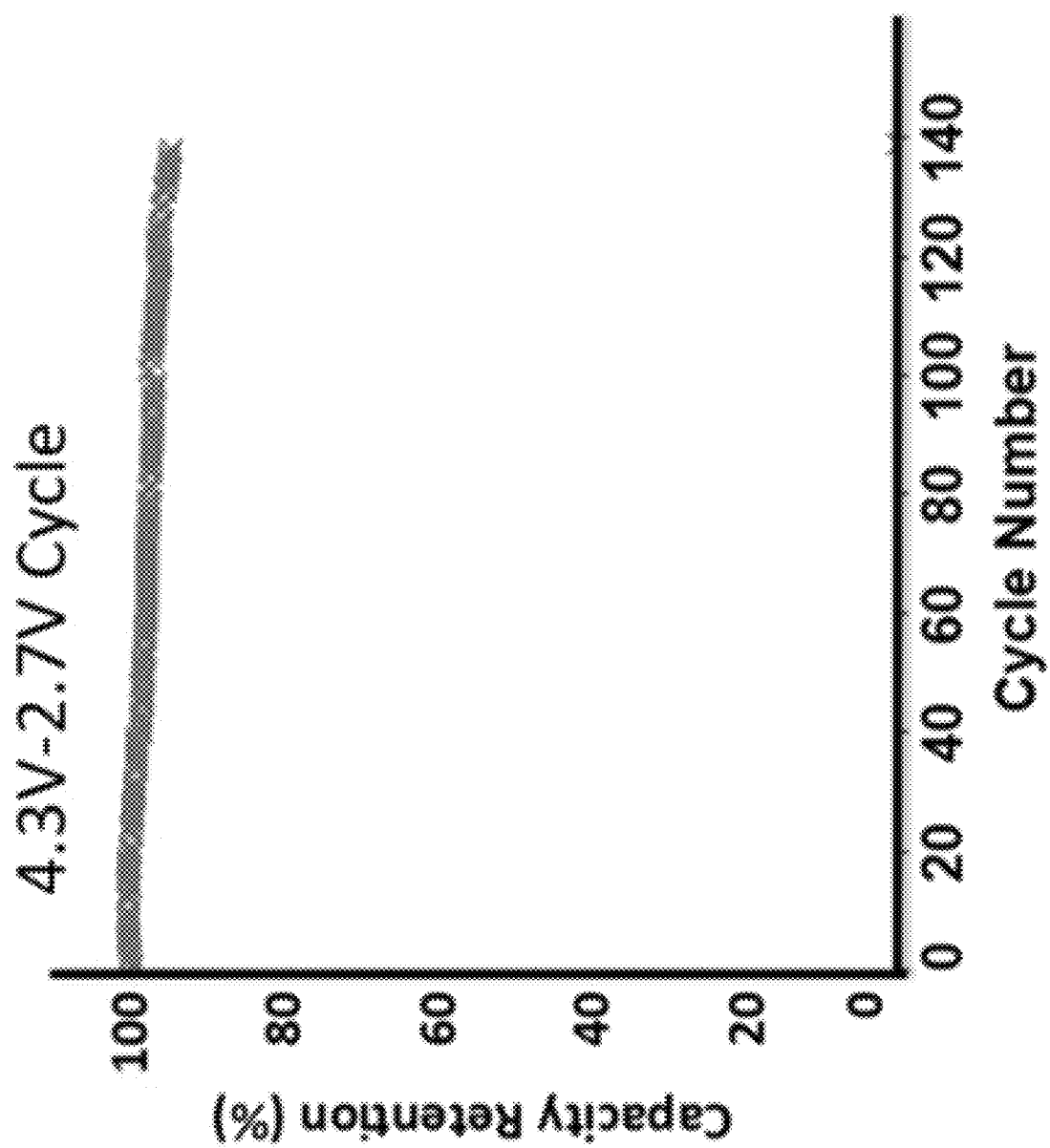
FIG. 12 is a graphical representation of capacity retention of a cell with a multi-layered electrode.

FIG. 10 presents a capacity retention plot of the Ex 8 cell with a voltage discharge from 4.2 V to 3.0 V. Under these conditions, the cell retains approximately 90% of its capacity after 100 cycles. FIG. 11 presents the capacity retention of the Ex 8 cell with a voltage discharge from 4.3 V to 2.7 V. With this larger depth of discharge, the cell only retains approximately 60% of its capacity after 100 cycles. FIG. 12 presents a capacity retention plot of the Ex 9 cell with a voltage discharge from 4.3 V to 2.7 V. After 100 cycles, the Ex 9 cell retained approximately 95% of its capacity. The cells in FIG. 10 and FIG. 11 were operated with similar depths of discharge and the Ex 9 cell with sputtered silicon retained significantly more of its capacity. The cells in FIG. 10, FIG. 11, and FIG. 12 were operated with charge and discharge rates of C/4 and C/3, respectively.

Figure 13:
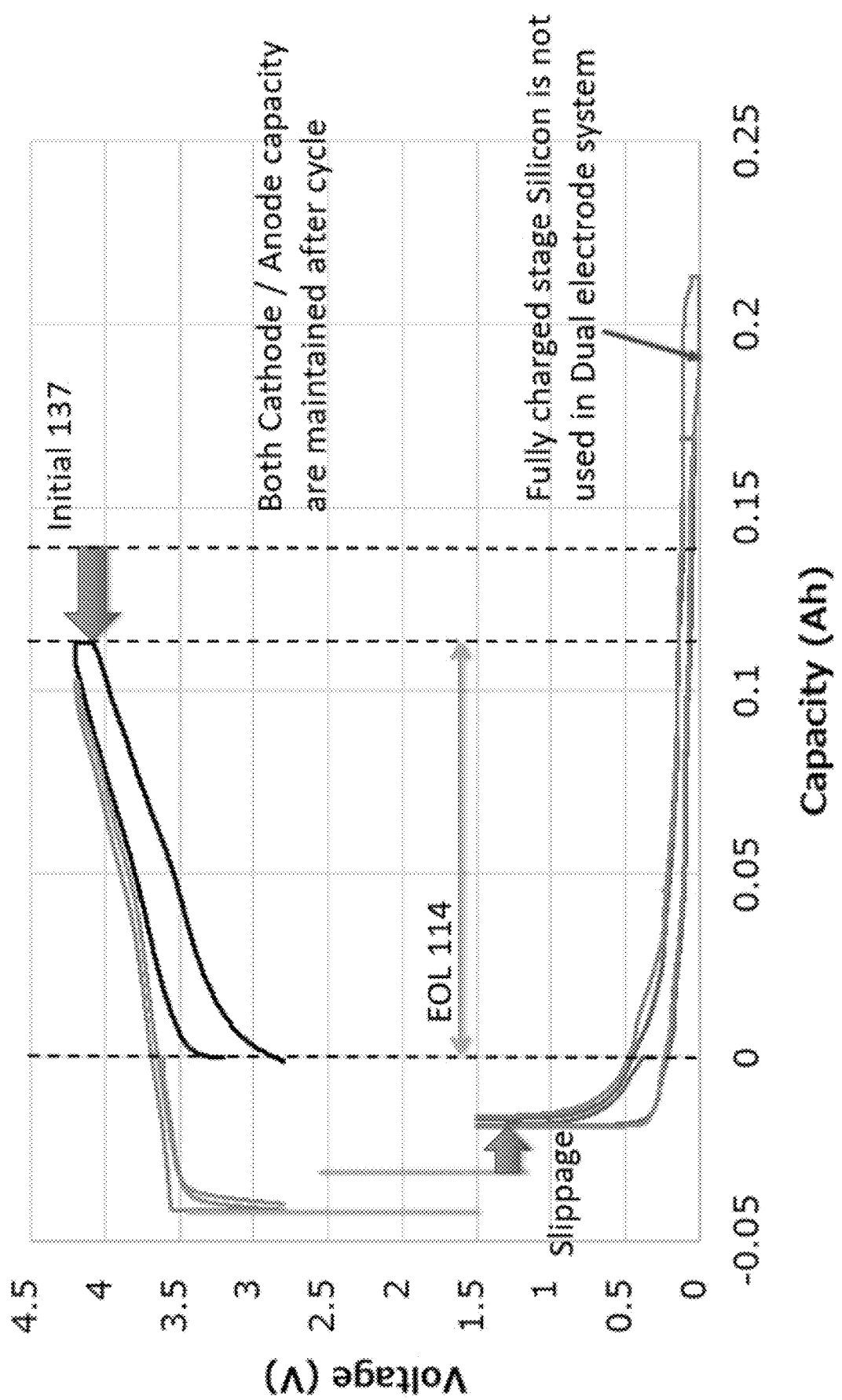
FIG. 13 is a graphical representation of a comparison between beginning of life vs. end of life capacity of a cell with a multi-layered electrode.

FIG. 13 presents a cell voltage vs. specific capacity of the first cycle after formation and the last cycle of a cycling test of a battery constructed in accordance with Ex 9. This is similar information as presented in FIG. 12 with respect to the capacity retention of cells constructed in accordance with Ex 9. This plot presents the minimal capacity loss associated with this battery design, as the charge/discharge curves follow a similar trajectory at the beginning of their lifetime as at the end.

Example 10 (Tin/Graphite Dual Anode Vs. 811 Cathode)

Figure 14:
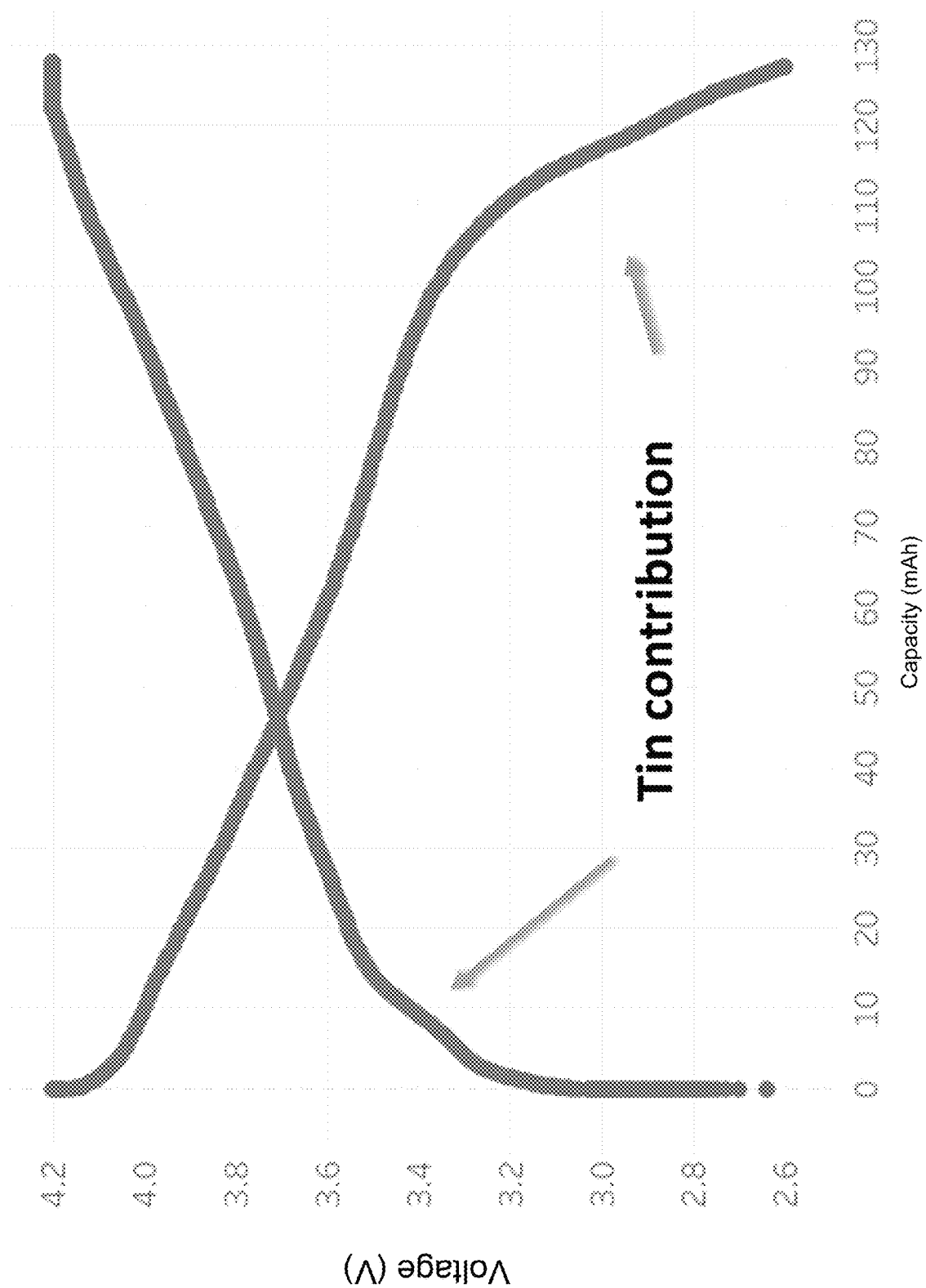
FIG. 14 is a graphical representation of the charge and discharge curves of a cell with a multi-layered electrode.

An electrochemical cell Example 10 (also referred to as "Ex 10") was prepared using a semi-solid cathode and a 2-layer semi-solid graphite/Tin metal anode. The semi-solid cathode was prepared by mixing 50 vol % NMC 811 powder and 2 vol % activated carbon with an ethylene carbonate/dimethyl carbonate/LiPF$_6$ based electrolyte. The cathode slurry was prepared using a using a centrifuged mixer. Mixing was performed at 1400 rpm for 2 minutes. The semi-solid slurry had a mixing indentation greater than 0.9 kPa and a conductivity of 1.5×10$^{-4}$ S/cm. The cathode slurry was made into an electrode of 200 µm thickness. The first layer tin is electrochemically deposited on the copper at a controlled thickness at 10 µm. The anode second layer graphite semi-solid slurry was prepared by mixing 53 vol % graphite powder and 2 vol % conductive carbon with an ethylene carbonate/dimethyl carbonate/LiPF$_6$ based electrolyte. The slurry using a centrifuged mixer and the mixing was performed at 1100 rpm for 2 minutes. The anode slurry was casted onto a Sn electrode of 250 µm thickness. FIG. 14 presents a first-cycle voltage vs. capacity plot for the Ex 10 cell between voltages of 4.2 and 2.6 V. The characterized Li—Sn alloying voltage at 0.4 V could be assigned to a clear plateau at 3.4 V in charge curves in FIG. 16, indicating two types of anode chemistry reactions.

Example 11 (Sn/Si/Graphite Anode)

An electrochemical cell Example 11 (also referred to as "Ex 11") was prepared using a semi-solid cathode and a 3-layer semi-solid Sn/Si/graphite anode. The semi-solid cathode was prepared by mixing 50 vol % NMC 811 powder and 2 vol % activated carbon with an ethylene carbonate/dimethyl carbonate/$LiPF_6$ based electrolyte. The cathode slurry was prepared using a using a centrifuged mixer. Mixing was performed at 1400 rpm for 2 minutes. The semi-solid slurry had a mixing indentation greater than 0.9 kPa and a conductivity of $1.5 \times 10^{-4}$ S/cm. The cathode slurry was made into an electrode of 200 μm thickness. The first layer Si is sputtered on the copper using a sputtering machine at a controlled thickness at 2 μm. The second layer Sn is electrochemically deposited on the sputtered Si at a controlled thickness at 10 μm. The anode top layer graphite semi-solid slurry was prepared by mixing 53 vol % Si-graphite blend powder and 2 vol % conductive carbon with an ethylene carbonate/dimethyl carbonate/$LiPF_6$ based electrolyte. The slurry using a centrifuged mixer and the mixing was performed at 1100 rpm for 2 minutes. The anode slurry was casted onto a Sn/Si electrode of 250 μm thickness.

Example 12 (2-Layer Cathode Vs. Semi-Solid Anode)

Figure 15:
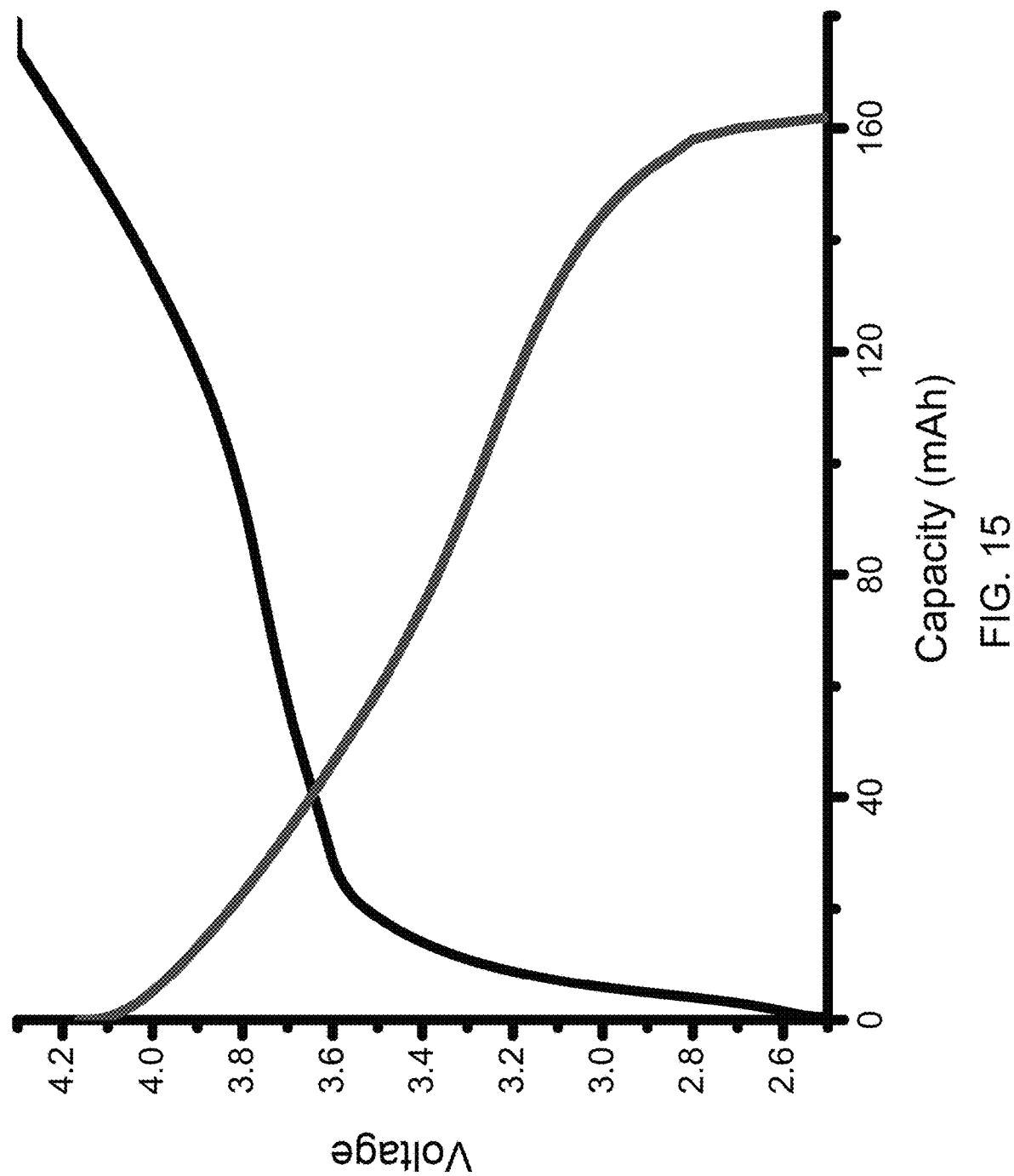
FIG. 15 is a graphical representation of the charge and discharge curves of a cell with a multi-layered electrode.

An electrochemical cell Example 12 (also referred to as "Ex 12") was prepared using a 2-layer cathode and a graphite semi-solid anode. The 2-layer cathode consisted of a first layer of sputtered $LiCoO_2$, and a semi-solid layer of $LiMnNiCoO_2$. The first layer had a thickness of 500 nm. The second layer had a thickness of 200 μm. The semi-solid layer of $LiMnNiCoO_2$ cathode was prepared by mixing 50 vol % NMC 811 powder and 2 vol % activated carbon with an ethylene carbonate/dimethyl carbonate/$LiPF_6$ based electrolyte. The slurry in the semi-solid layer was prepared using a centrifuged mixer. Mixing was performed at 1200 rpm for 2 minutes. The semi-solid slurry had a mixing indentation greater than 0.9 kPa and a conductivity of $1.5 \times 10^{-3}$ S/cm. The anode second layer graphite semi-solid slurry was prepared by mixing 53 vol % graphite powder and 2 vol % conductive carbon with an ethylene carbonate/dimethyl carbonate/$LiPF_6$ based electrolyte. The slurry using a centrifuged mixer and the mixing was performed at 900 rpm for 30 seconds. The anode slurry was casted onto a copper collector of 250 m thickness. FIG. 15 presents a first-cycle voltage vs. capacity plot for the Ex 12 cell between voltages of 4.3 and 2.5 V.

Example 13 (3-Layer Cathode with Dual Electrolyte)

An electrochemical cell Example 13 (also referred to as "Ex 13") was prepared using a 3-layer cathode with LiPON coating and a graphite semi-solid anode. The 3-layer cathode consisted of a first layer of sputtered $LiCoO_2$, and a semi-solid layer of $LiMnNiCoO_2$ in the middle and the sputtered LiPON to fill in the surface of the cathode. The first layer had a thickness of 500 nm. The second layer had a thickness of 200 μm, and the top layer had a thickness of 20 nm. The semi-solid layer of $LiMnNiCoO_2$ cathode was prepared by mixing 50 vol % NMC 811 powder and 2 vol % activated carbon with an ethylene carbonate/acetonitrile/$LiPF_6$ based electrolyte. The slurry in the semi-solid layer was prepared using a centrifuged mixer. Mixing was performed at 1200 rpm for 2 minutes. The anode second layer graphite semi-solid slurry was prepared by mixing 53 vol % graphite powder and 2 vol % conductive carbon with an ethylene carbonate/dimethyl carbonate/$LiPF_6$ based electrolyte. The slurry using a centrifuged mixer and the mixing was performed at 900 rpm for 30 seconds. The anode slurry was casted onto a copper collector of 250 m thickness. The cell was assembled in a pouch cell format to enable the separation of catholyte and anolyte.

Example 14 (Both Side Dual Electrode)

An electrochemical cell Example 14 (also referred to as "Ex 14") was prepared using a 2-layer $LiCoO_2$/$LiMnNiCoO_2$ cathode coating and a 2-layer graphite/Si semi-solid anode. The 2-layer cathode consisted of a first layer of sputtered $LiCoO_2$, and a semi-solid layer of $LiMnNiCoO_2$. The first layer had a thickness of 500 nm. The second layer had a thickness of 200 m. The semi-solid layer of $LiMnNiCoO_2$ cathode was prepared by mixing 50 vol % NMC 811 powder and 2 vol % activated carbon with an ethylene carbonate/dimethyl carbonate/$LiPF_6$ based electrolyte. In the anode side, the first layer of Si was sputtered on the copper using a sputtering machine at a controlled thickness at 2 μm. The anode second layer graphite semi-solid slurry was prepared by mixing 53 vol % graphite powder and 2 vol % conductive carbon with an ethylene carbonate/dimethyl carbonate/$LiPF_6$ based electrolyte. The slurry using a centrifuged mixer and the mixing was performed at 1100 rpm for 2 minutes. The anode slurry was casted onto a Si electrode of 220 μm thickness.

The invention claimed is:

1. An electrode comprising:
   a current collector;
   a first electrode layer disposed on the current collector, the first electrode layer comprising a solid electrode material having a first density and a porosity greater than 0% and less than about 5%, the first electrode layer including a high-capacity material including at least one of tin, silicon, antimony, aluminum, and titanium oxide, the first electrode layer including a binder; and
   a second electrode layer disposed on the first electrode layer, the second electrode layer comprising a slurry electrode material including a mixture of an active material and a conductive material in a liquid electrolyte, the second electrode layer having a second density different than the first density,
   wherein the electrode is an electrode in a lithium-ion battery operating via at least one of intercalation or alloying of lithium ions in each of the first electrode layer and the second electrode layer of the electrode.

2. The electrode of claim 1, wherein the electrode has a specific capacity of at least 200 mAh/g.

3. The electrode of claim 1, wherein the first electrode layer includes about 10% to about 20% by volume of the high-capacity material.

4. The electrode of claim 1, wherein the electrode has a thickness between about 150 μm and about 2,000 μm.

5. An electrode comprising:
   a current collector;
   a first electrode layer disposed on the current collector, the first electrode layer comprising a high-capacity solid electrode material and having a first density and a porosity greater than 0% and less than about 5%, the high-capacity solid electrode material including at least one of tin, silicon, antimony, aluminum, and titanium oxide, the first electrode layer including a binder; and a second electrode layer disposed on the first electrode layer, the second electrode layer comprising a semi-solid electrode material including a mixture of an active material and a conductive material in a liquid electrolyte, the second electrode layer having a second density different than the first density, wherein the electrode is an electrode in a lithium-ion battery operating via at least one of intercalation or alloying of lithium ions in each of the first electrode layer and the second electrode layer of the electrode, and wherein the electrode has a specific capacity of at least about 200 mAh/g.

6. The electrode of claim 5, wherein the first electrode layer includes about 10% to about 20% by volume of the high-capacity material.

7. The electrode of claim 5, wherein the electrode has a thickness between about 150 µm and about 2,000 µm.

8. An electrode comprising:

a current collector;

a first electrode layer disposed on the current collector, the first electrode layer including sputtered silicon and having a porosity greater than 0% and less than about 5%; and a second electrode layer disposed on the first electrode layer, the second electrode layer comprising a semi-solid electrode material including a mixture of an active material and a conductive material in a liquid electrolyte;

a third electrode layer disposed between the first electrode layer and the second electrode layer, the third electrode layer comprising a lithium-containing material, wherein the electrode is an electrode in a lithium-ion battery operating via at least one of intercalation or alloying of lithium ions in each of the first electrode layer and the second electrode layer of the electrode.

9. The electrode of claim 8, wherein the electrode has a specific capacity of at least about 200 mAh/g.

10. The electrode of claim 8, wherein the electrode has a thickness between about 150 µm and about 2,000 µm.

11. The electrode of claim 1, wherein the first electrode layer has a thickness between about 3% and about 50% of a total thickness of the electrode.

12. The electrode of claim 1, wherein the second electrode layer has a thickness between about 50% and about 99% of a total thickness of the electrode.

13. The electrode of claim 1, wherein during operation, ions are shuttled through the second electrode layer at a first rate and through the first electrode layer at a second rate, the second rate less than the first rate.

14. The electrode of claim 5, wherein the first electrode layer has a thickness between about 3% and about 50% of a total thickness of the electrode.

15. The electrode of claim 5, wherein the second electrode layer has thickness between about 50% and about 99% of a total thickness of the electrode.

16. The electrode of claim 5, wherein during operation, ions are shuttled through the second electrode layer at a first rate and through the first electrode layer at a second rate, the second rate less than the first rate.

17. The electrode of claim 8, wherein the first electrode layer has thickness between about 3% and about 50% of a total thickness of the electrode.

18. The electrode of claim 8, wherein the second electrode layer has a thickness between about 50% and about 99% of a total thickness of the electrode.

19. The electrode of claim 8, wherein during operation, ions are shuttled through the second electrode layer at a first rate and through the first electrode layer at a second rate, the second rate less than the first rate.

20. The electrode of claim 1, wherein the second electrode layer further includes silicon.

21. The electrode of claim 5, wherein the second electrode layer further includes silicon.

* * * * *